United States Patent

Brown et al.

Patent Number: 6,068,323
Date of Patent: May 30, 2000

[54] MOUNTING ASSEMBLY AND METHOD FOR A VEHICLE SUNVISOR

[75] Inventors: Trevor S. Brown, Fishers; Christopher D. Young, Redkey, both of Ind.

[73] Assignee: Crotty Corporation, Quincy, Mich.

[21] Appl. No.: 09/137,903

[22] Filed: Aug. 20, 1998

[51] Int. Cl.[7] ........................................................ B60J 3/00
[52] U.S. Cl. ..................................... 296/97.9; 248/292.13
[58] Field of Search .................................. 296/97.9, 214; 248/289.11, 291.1, 292.13; 403/348, 350

[56] References Cited

U.S. PATENT DOCUMENTS

| | | | |
|---|---|---|---|
| 5,004,289 | 4/1991 | Lanser et al. | 296/97.12 |
| 5,031,954 | 7/1991 | Peterson et al. | 296/97.9 |
| 5,042,867 | 8/1991 | Crotty, III et al. | 296/97.8 |
| 5,061,005 | 10/1991 | Van Order et al. | 296/97.9 |
| 5,131,711 | 7/1992 | Laferle | 276/97.1 |
| 5,205,635 | 4/1993 | Van Order et al. | 362/83.1 |
| 5,205,639 | 4/1993 | White et al. | 362/137 |
| 5,365,416 | 11/1994 | Peterson | 362/135 |
| 5,507,545 | 4/1996 | Krysiak | 296/97.9 |
| 5,580,118 | 12/1996 | Crotty, III | 296/97.12 |
| 5,765,897 | 6/1998 | Snyder et al. | 296/97.9 |
| 5,857,728 | 1/1999 | Crotty, III | 296/97.9 |
| 5,860,690 | 1/1999 | Dellinger et al. | 296/97.1 |
| 5,887,933 | 3/1999 | Peterson | 296/97.1 |

*Primary Examiner*—D. Glenn Dayoan
*Assistant Examiner*—Paul Chenevert
*Attorney, Agent, or Firm*—Baker & Daniels

[57] ABSTRACT

A sunvisor assembly comprising a mounting assembly and a vehicle visor blade pivotally mounted on a support rod. The mounting assembly attaches the sunvisor assembly to a headliner prior to the installation of the headliner in a vehicle. The mounting assembly also attaches the sunvisor assembly to a roof panel in the vehicle when the headliner and sunvisor assembly are installed in the vehicle. The mounting assembly includes an elbow attachable to the support rod, a mounting bracket, an inner bracket and a camming member. A distal section of the elbow defines an axis about which the visor blade is rotatable and is insertable through a central opening in the mounting bracket. The mounting bracket also includes a laterally extending shroud disposed radially outwardly of the central opening. The inner bracket is attached to the distal section of the elbow and includes retaining members which extend radially outwardly from the inner bracket. The retaining members extend outwardly between axially extending securement members disposed on the mounting bracket. The mounting assembly is attached to the headliner by inserting a distal portion of the mounting assembly including the retaining members through an aperture in the headliner to engage the shroud with the proximal surface of the headliner. The mounting assembly is then rotated relative to the headliner aperture to engage the retaining members with the distal surface of the headliner and thereby attach the mounting assembly to the headliner. The mounting assembly and attached headliner are then installed in a vehicle by inserting the securement members through an aperture in a roof panel in the vehicle. A camming member is operatively disposed between the elbow and the mounting bracket and relative rotation of the elbow and mounting bracket biases the elbow and attached inner bracket in an axially proximal direction relative to the mounting bracket. The inner bracket is engaged with the radially inner surface of the securement members and the proximal axial movement of the inner bracket relative to the mounting bracket biases the securement members radially outwardly and into engagement with the vehicle roof panel.

33 Claims, 12 Drawing Sheets

FIG_1

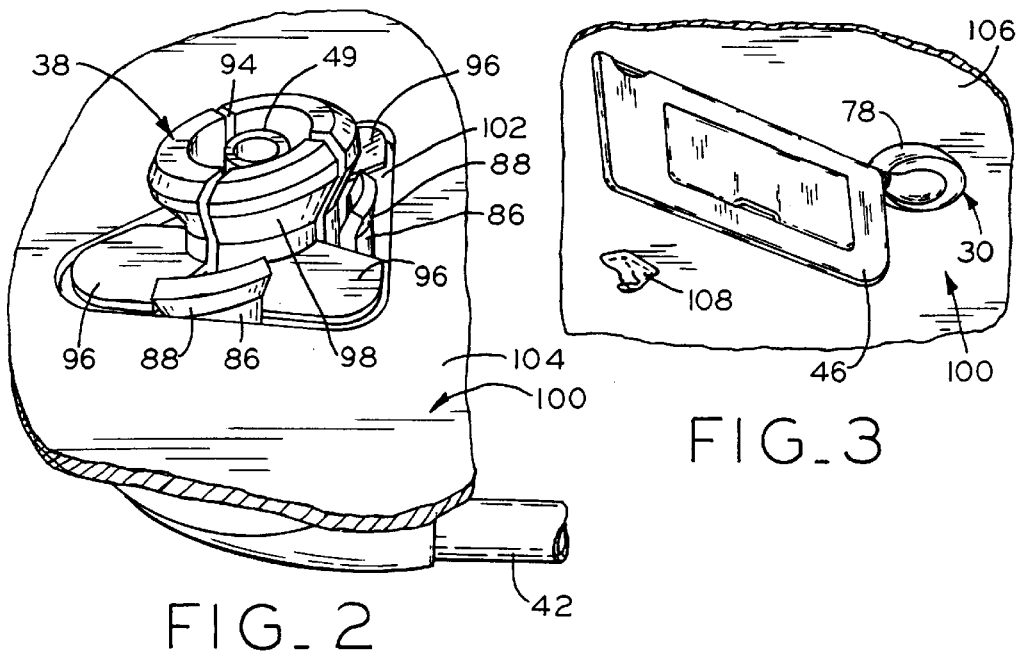
FIG. 2
FIG. 3
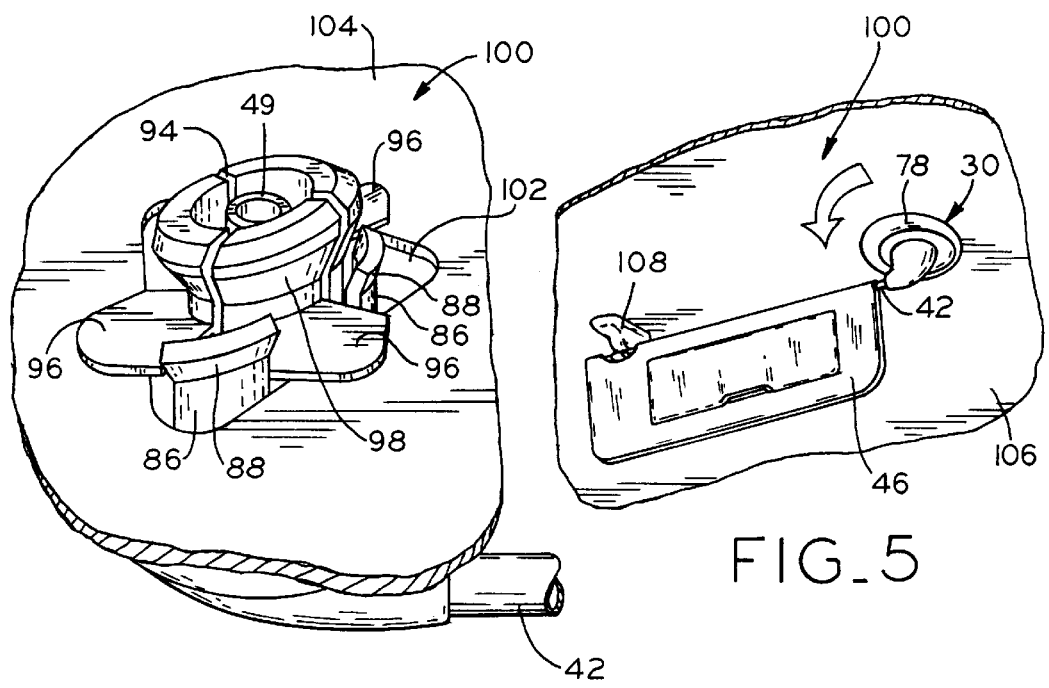
FIG. 4
FIG. 5

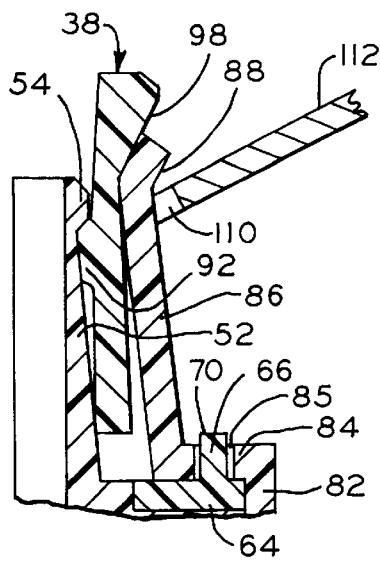
FIG_6
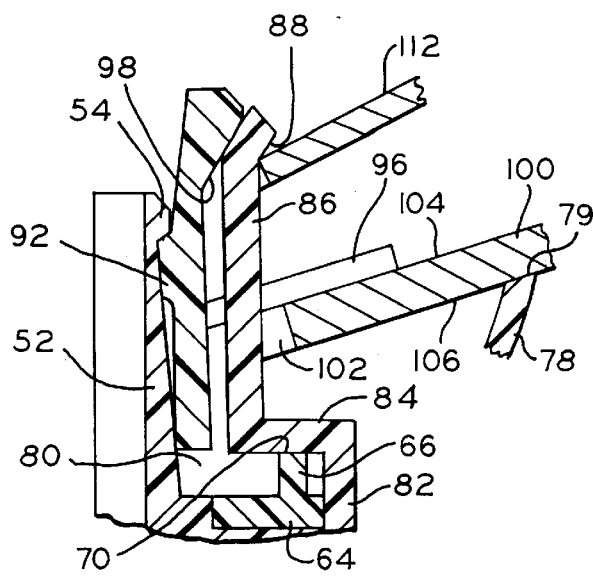
FIG_7
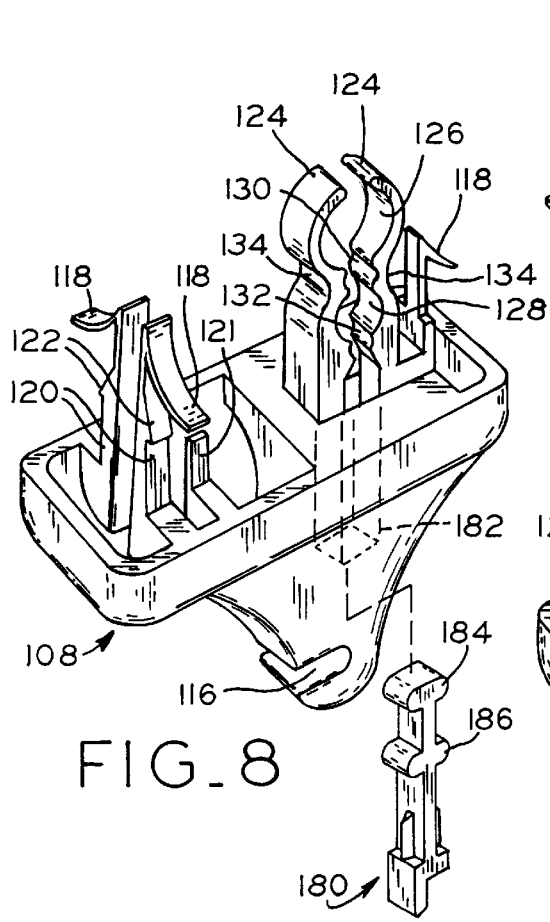
FIG_8
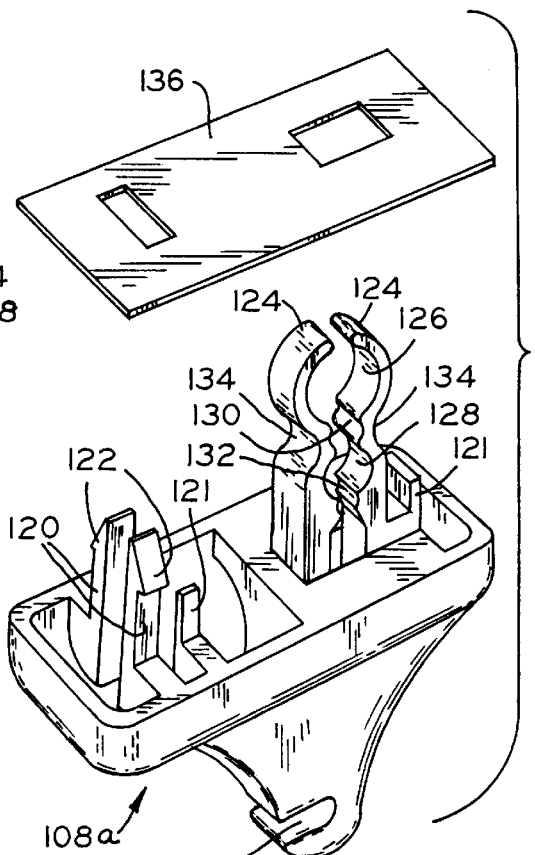
FIG_9

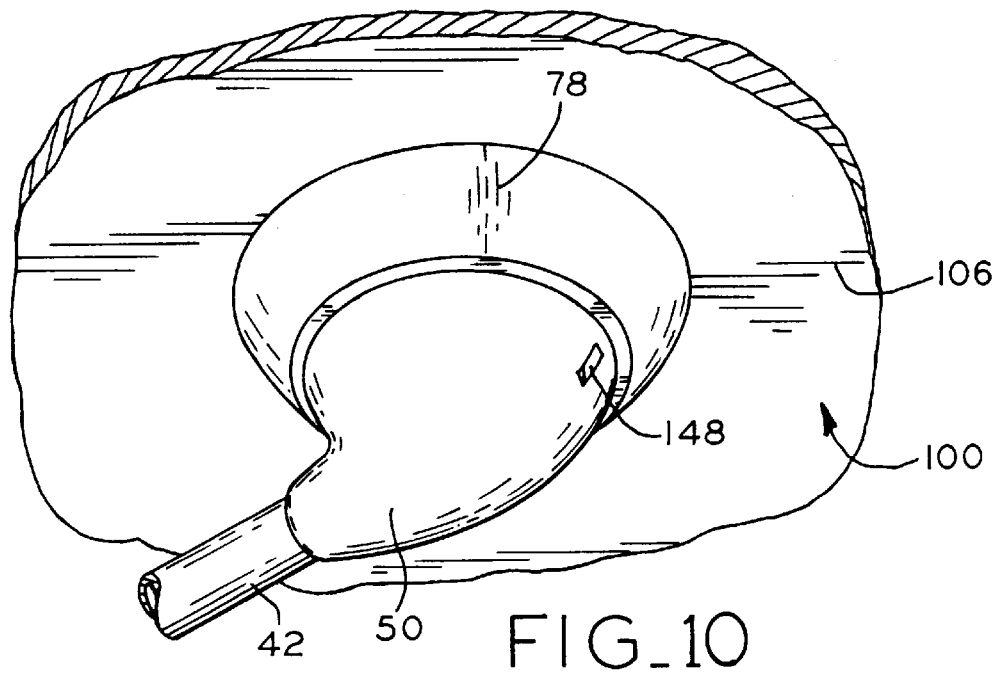
FIG_10
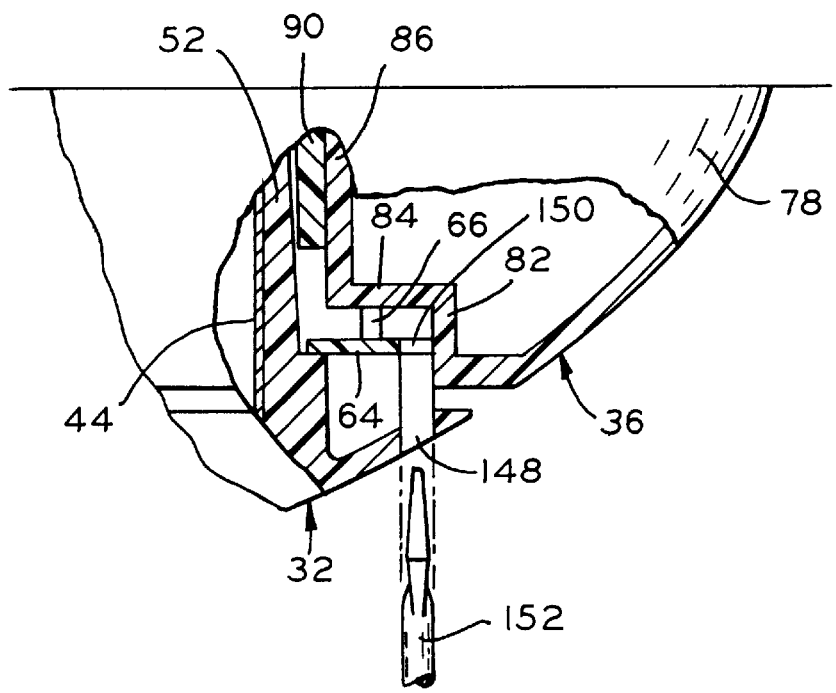
FIG_11

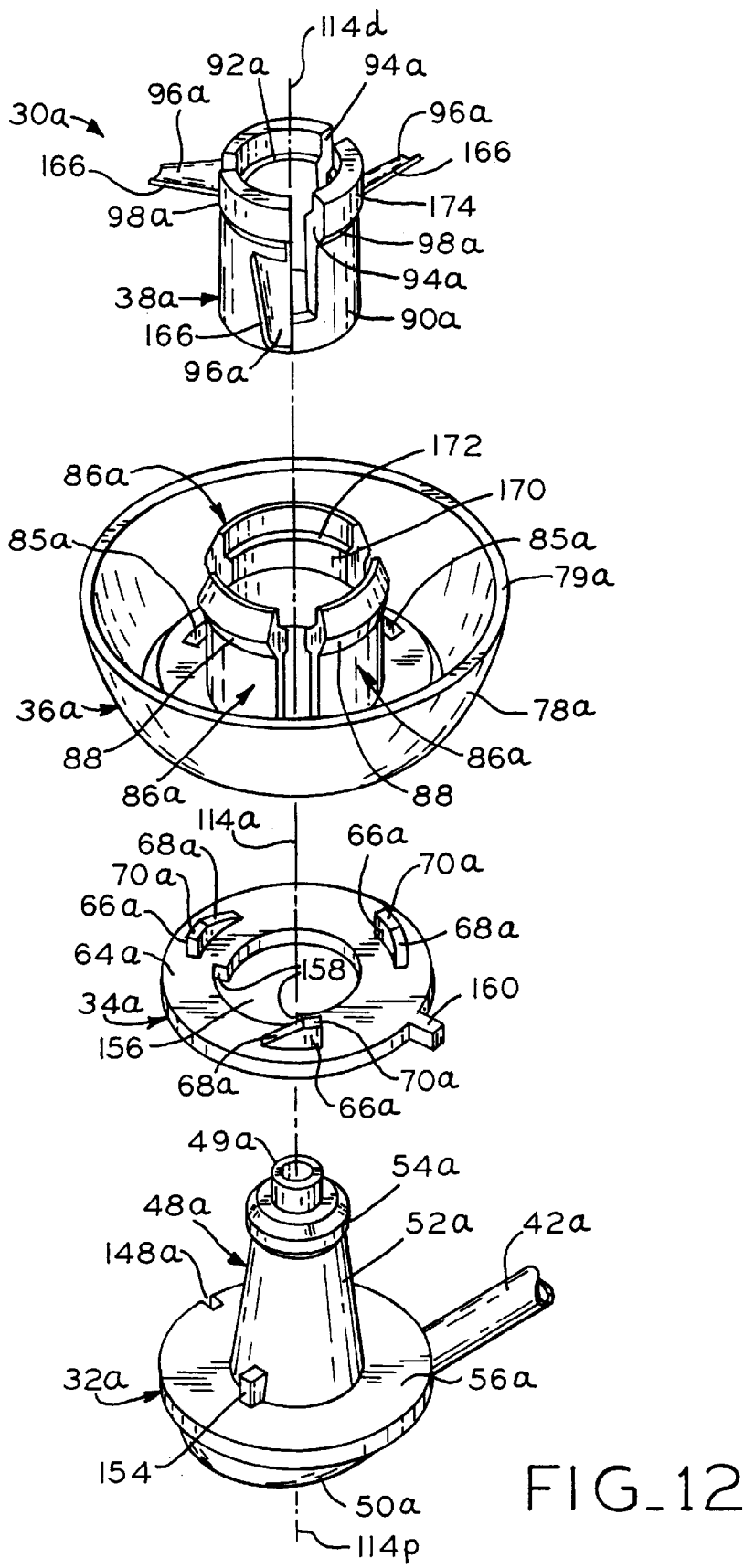
FIG_12

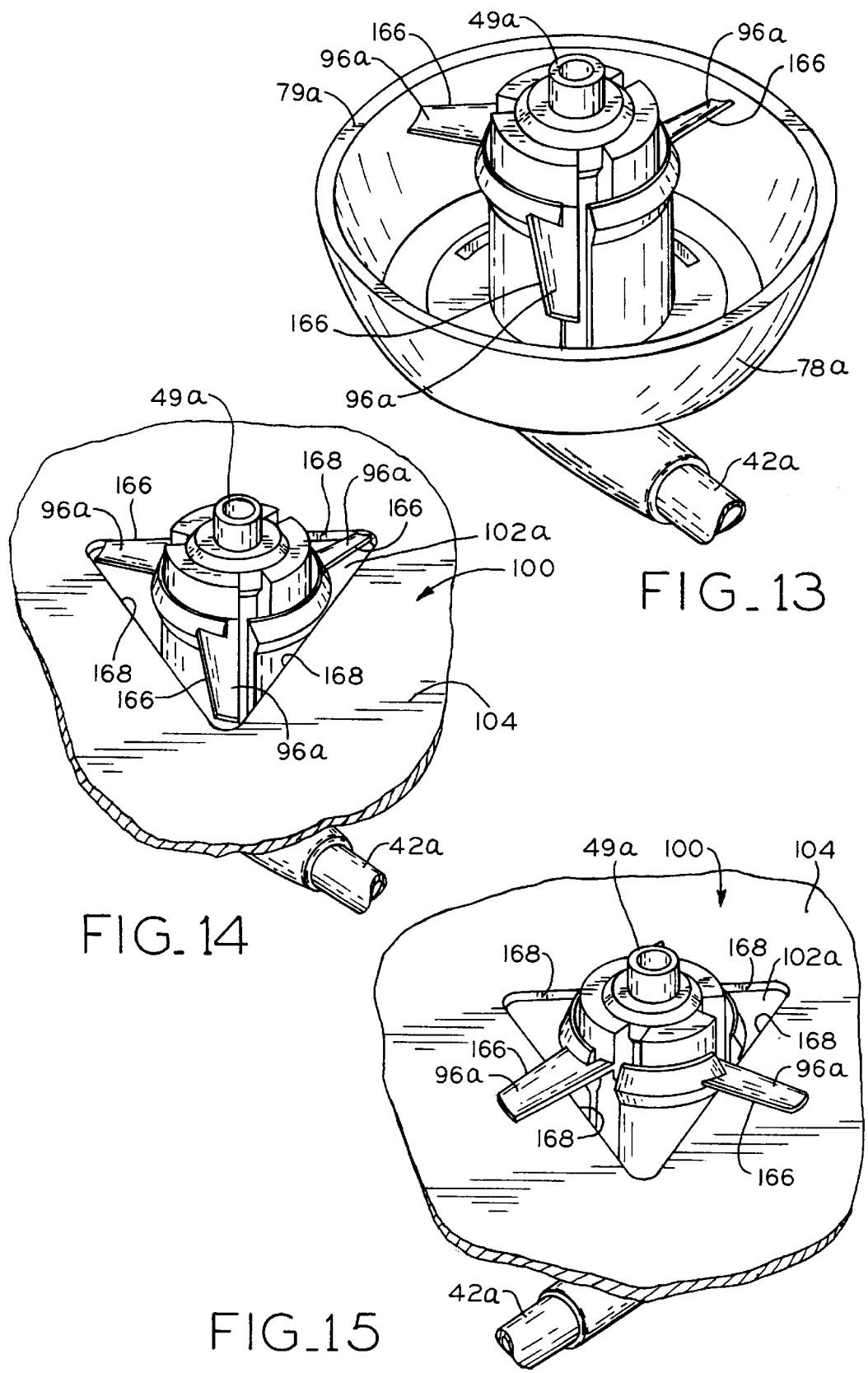

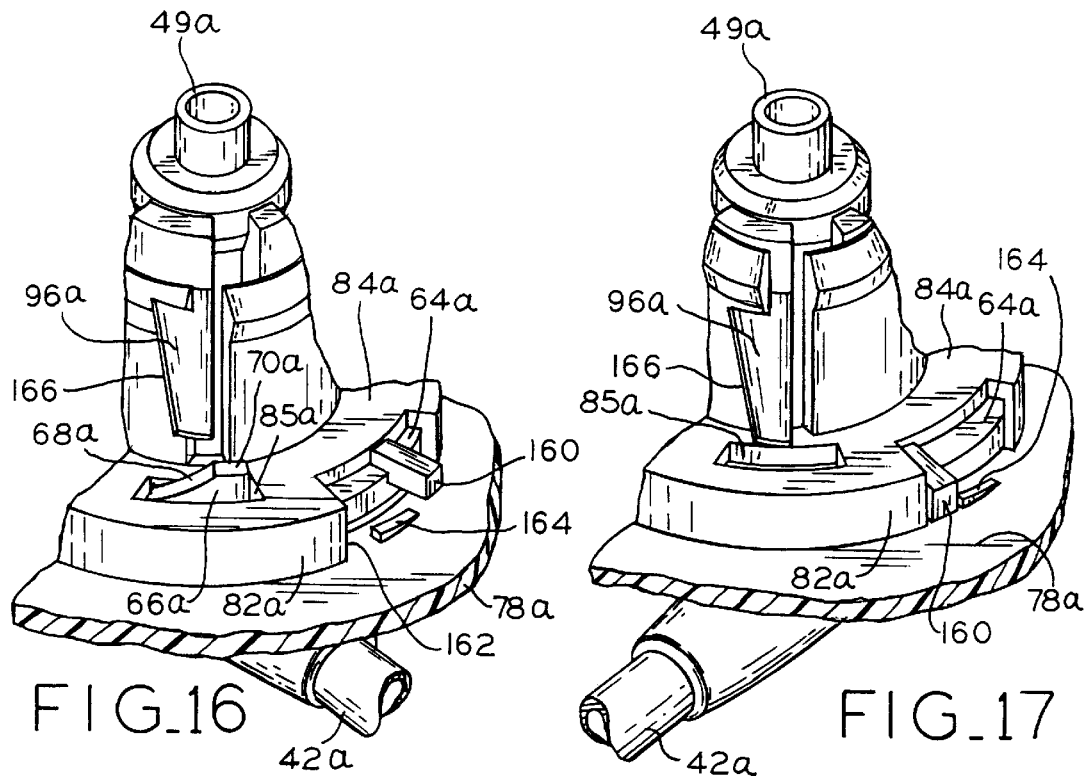
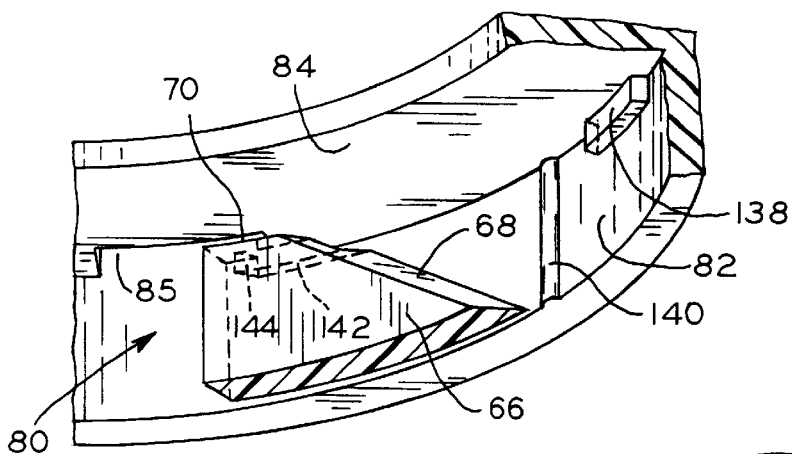
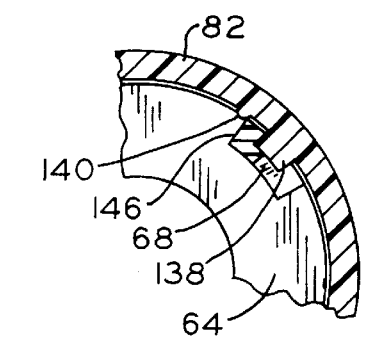

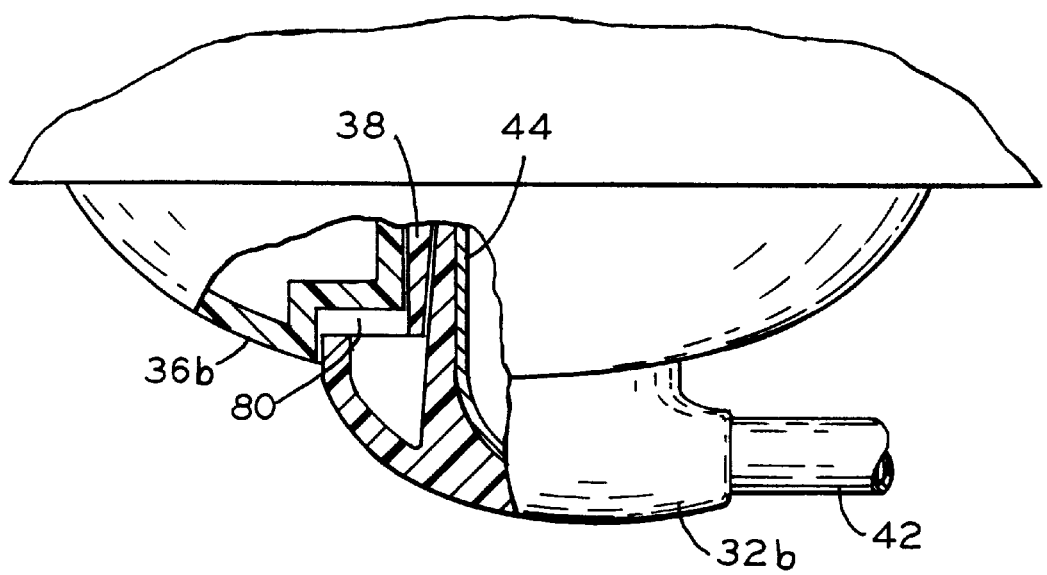
FIG_20
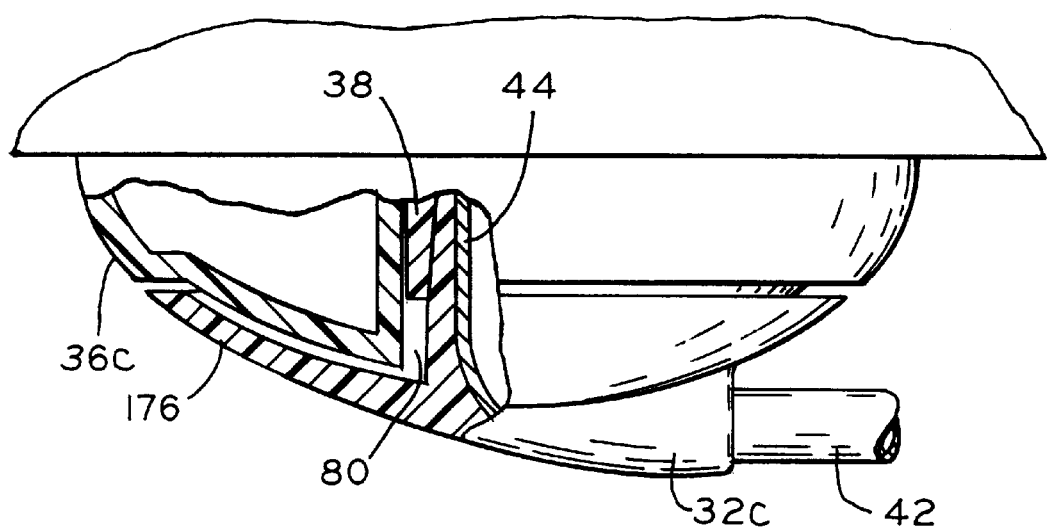
FIG_21

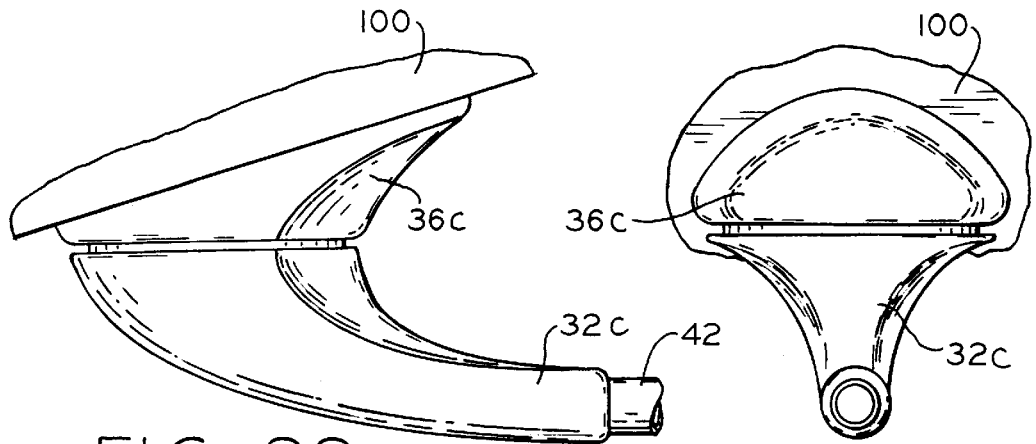
FIG_22  FIG_23
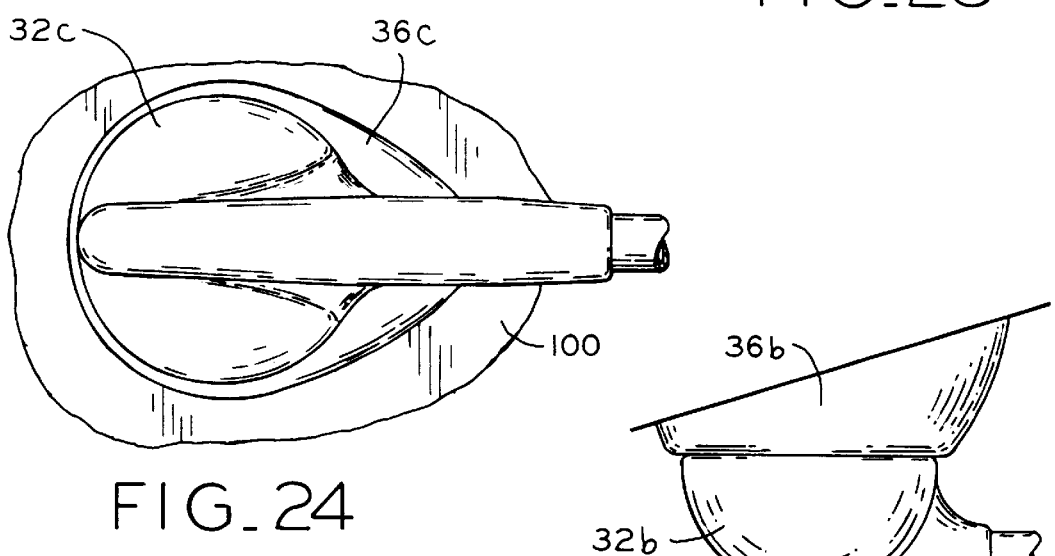
FIG_24  FIG_25
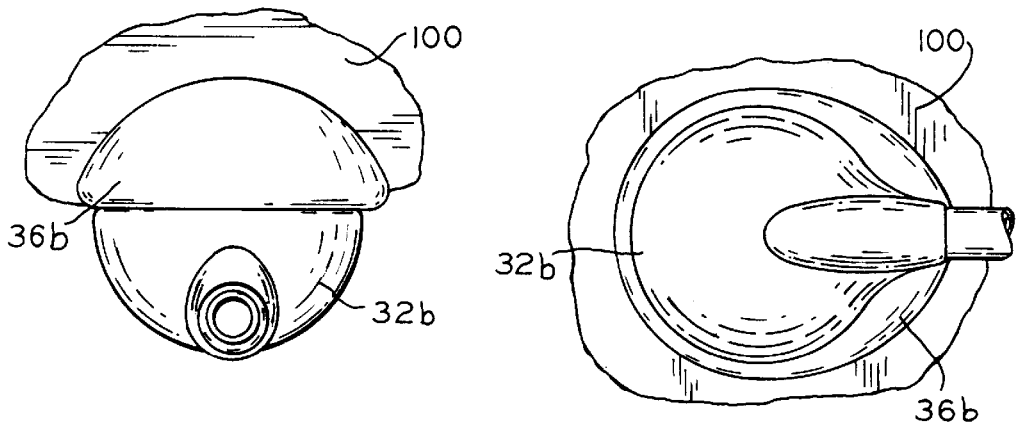
FIG_26  FIG_27

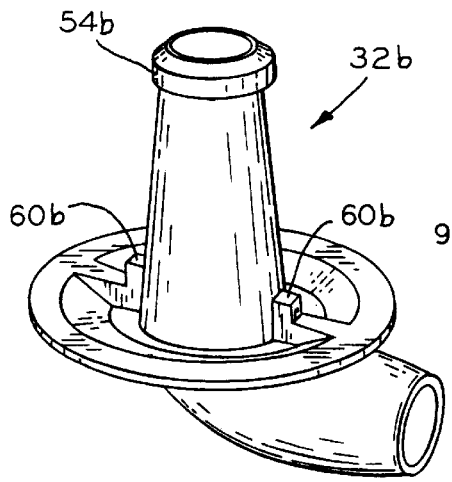
FIG_28
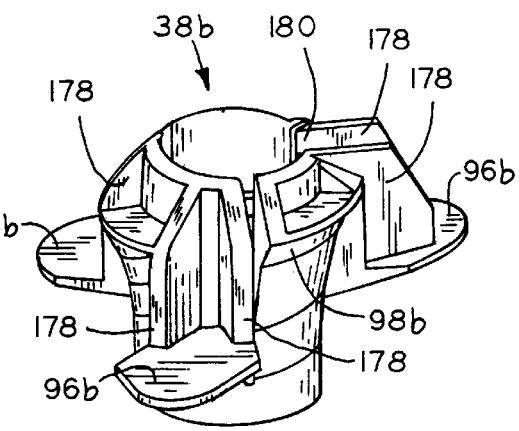
FIG_29
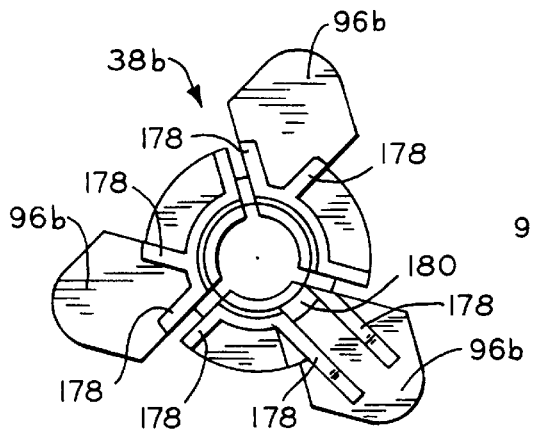
FIG_30
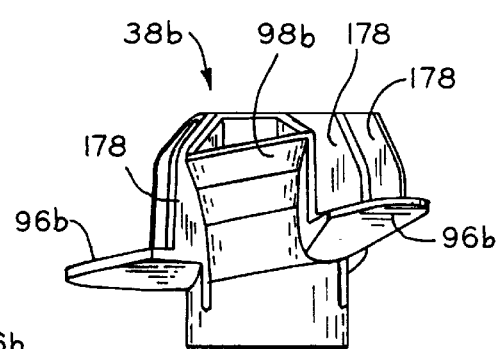
FIG_31
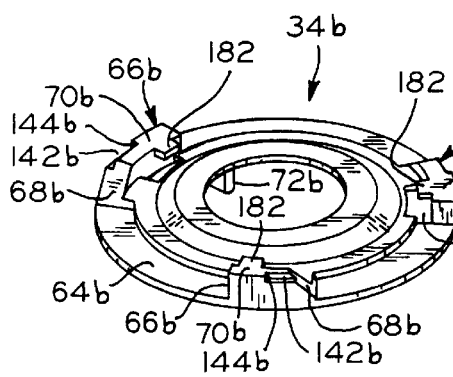
FIG_32
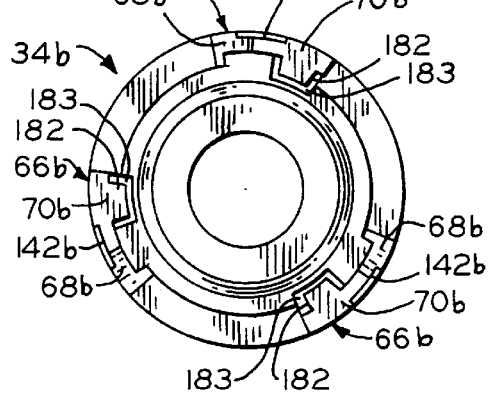
FIG_33

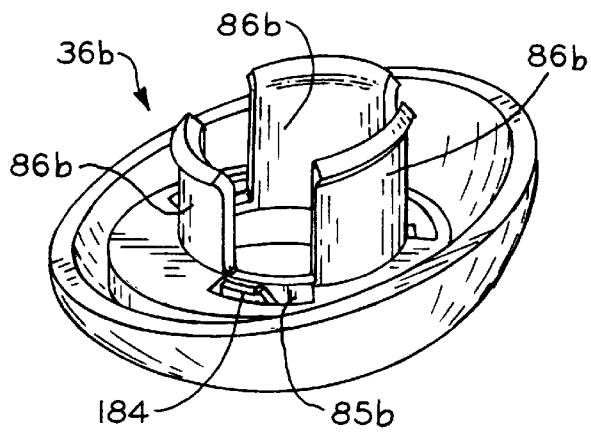
FIG_34
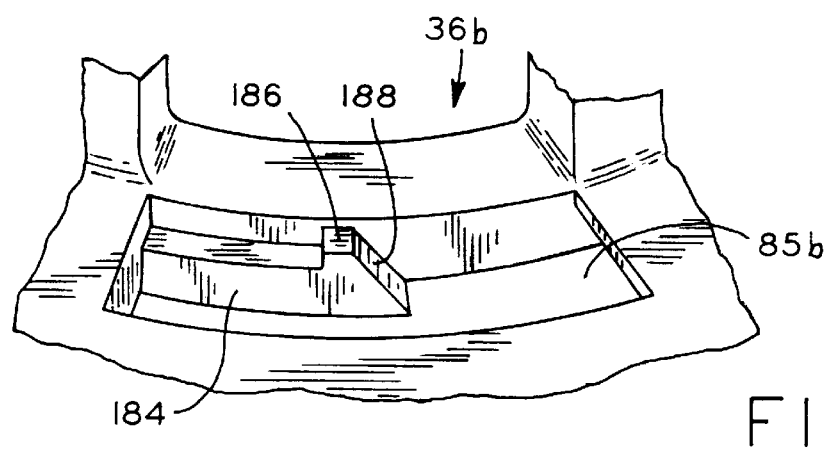
FIG_35
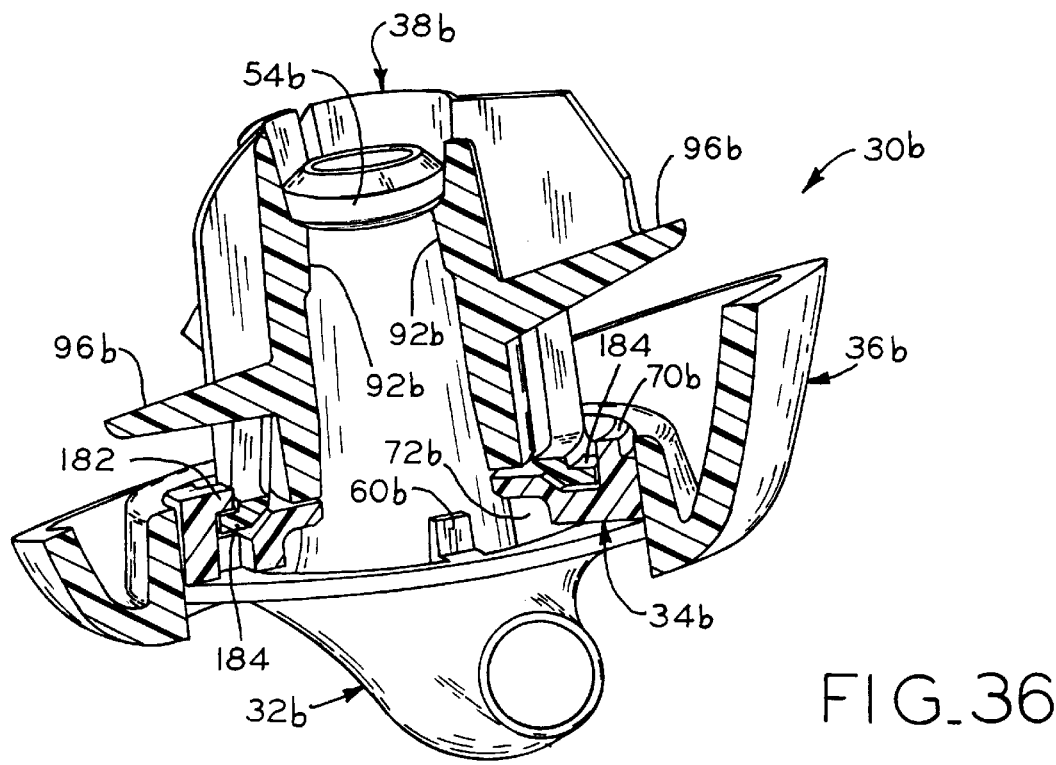
FIG_36

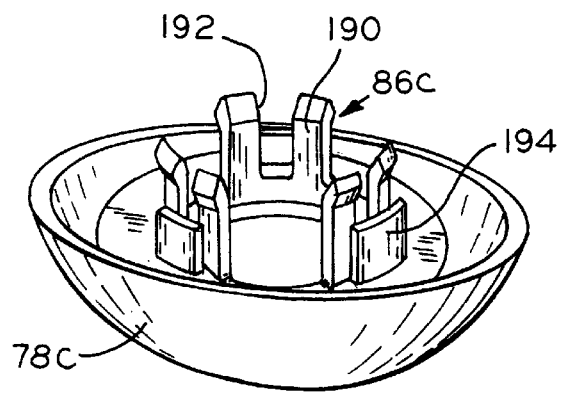
FIG_37
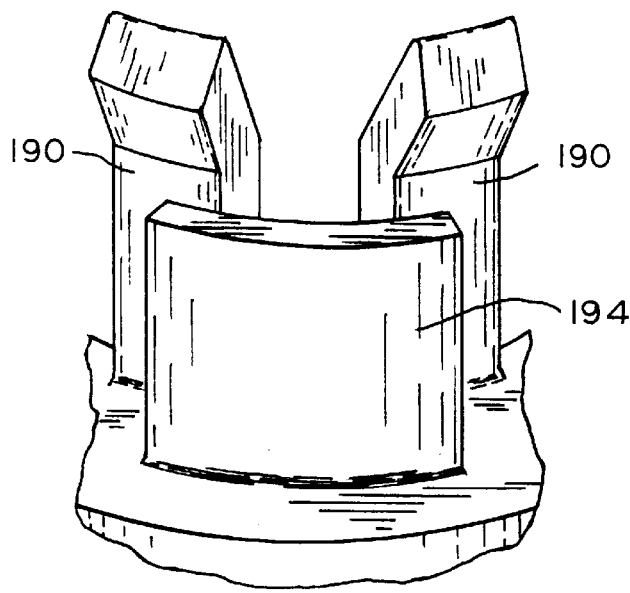
FIG_38
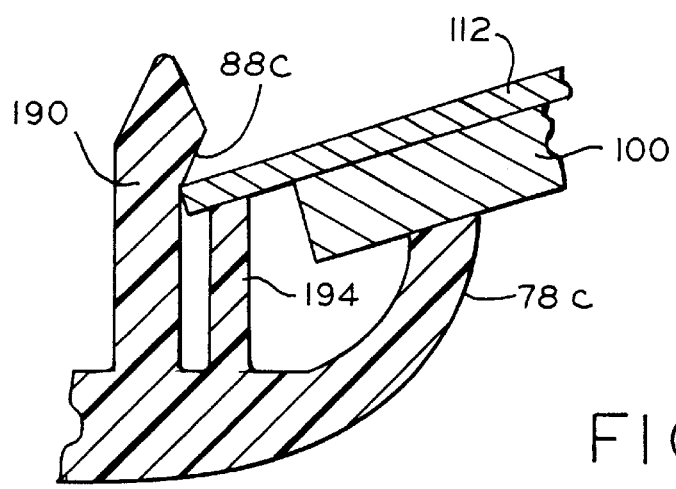
FIG_39 we're 6,068,323

MOUNTING ASSEMBLY AND METHOD FOR A VEHICLE SUNVISOR

BACKGROUND OF THE INVENTION

1. Field of the Invention.

The present invention relates to mounting assemblies for vehicle sunvisors.

2. Description of the Related Art.

Sunvisors for vehicles are generally mounted near an upper corner of the windshield. Sunvisors typically include a visor blade which may be rotated about a horizontal axis between a storage position adjacent the vehicle headliner and a use position adjacent a windshield of the vehicle. Conventional sunvisors are also typically rotatable about a vertical axis to permit the visor blade to be positioned alongside either the windshield or a side window. Conventional mounting bracket assemblies often utilize screws to attach the sunvisor assembly to the sheet metal panel which forms the vehicle roof. The visor assembly is commonly attached after a headliner has been installed in the vehicle to upholster the interior surface of the vehicle roof.

Screwless assemblies for mounting sunvisors within a vehicle which permit the sunvisor to be installed without tools are also known. One example of a screwless mounting assembly is disclosed in U.S. Pat. No. 5,499,854, assigned to the assignee of the present application, the disclosure of which is expressly incorporated herein by reference.

SUMMARY OF THE INVENTION

The present invention provides an improved mounting assembly for a vehicle sunvisor which permits the sunvisor to be attached to the headliner prior to the installation of the headliner in the vehicle. The headliner, with attached sunvisor assemblies, can then be shipped to a location where the vehicle is being assembled and where the headliner and attached sunvisor assemblies can be installed in the vehicle. The present invention also provides a mounting assembly which does not require the use of tools for installing the sunvisor assembly in the vehicle.

The invention comprises, in one form thereof, an assembly which includes an elbow, a camming element, a mounting bracket and an inner bracket which are used to mount a sunvisor assembly to a headliner and subsequently to a vehicle roof panel. The elbow is attached to a support rod having a visor blade pivotally mounted on an elongate portion of the support rod. The elbow has a mounting section which defines an axis of rotation which is disposed at an approximately 90° angle to the elongate portion of the support rod. The mounting, or distal, section of the elbow is insertable into a central opening of the mounting bracket. The mounting section of the elbow also includes a rotation lug for engaging the locking disk. The locking disk may take the form of a washer-shaped disk with arcuate lifting ramps disposed on one side thereof. The mounting section of the elbow is inserted through the opening of the locking disk prior to insertion through the central opening of the mounting bracket.

The mounting bracket includes a central opening around which is positioned a recess for receiving the locking disk. A shroud surrounds the recess and has an outer edge which is engageable with the headliner and provides an aesthetic exterior surface for the mounting assembly. The mounting bracket also includes a plurality of securement members positioned around the central opening and extending in a distal direction. (As used herein, proximal and distal are used to denote directions along the axis of rotation of the mounting section of the elbow in an installed mounting assembly with the end of the elbow nearest the visor blade being the proximate end and the terminal end of mounting section which is inserted into the central opening of the mounting bracket representing the distal end of the elbow.) The securement members are flexible finger-like extensions which are engageably insertable into an apertured vehicle panel.

When the elbow and locking disk are assembled with the mounting bracket, the locking disk is placed between the mounting bracket and the elbow in the recess and the arcuate lifting ramps are positioned within slots in the mounting bracket. An inner bracket is placed over the distal end of the elbow mounting section and engaged, and thereby retained, by an annular flange located on the elbow. The inner bracket includes retaining members which extend radially outwardly from the inner bracket through spaces between the securement members of the mounting bracket.

The mounting assembly and visor is then attached to a headliner for a vehicle. The headliner includes an aperture through which a distal portion of the assembly, including the retaining members, is inserted. The assembly is then rotated whereby the retaining members are placed in engagement with a rear surface of the headliner and the removal of the assembly from the headliner opening is thereby prevented. The headliner may have visor blade assemblies installed in openings adjacent both front corners of the headliner prior to installation of the headliner in a vehicle.

When the headliner is installed in a vehicle the securement members of the mounting bracket are inserted through an aperture in a sheet metal roof panel of the vehicle. The elbow is then rotated relative to the mounting bracket whereby the rotation lug of the elbow engages and rotates the locking disk. As the locking disk is rotated relative to the mounting bracket, the lifting ramps are rotated out of the slots in the mounting bracket and, as the locking disk forces the elbow axially away from the mounting bracket in a proximate direction, the annular flange of the elbow pulls the inner bracket in a proximal axial direction. The inner bracket includes outwardly directed camming surfaces which engage the radially inward surfaces of the securement members. As the lifting ramps pull the inner bracket proximally, the camming surfaces on the inner bracket force the securement members of the mounting bracket radially outward. The securement members have outwardly directed locking catches near their distal ends which are thereby biased outward and prevent the mounting assembly from being removed from the aperture in the vehicle panel.

An advantage of the present invention is that it allows visor blade assemblies to be attached to the headliner prior to the installation of the headliner in a vehicle. This permits a headliner assembly, including attached visor blades, to be manufactured separately from the vehicle and to be subsequently installed in the vehicle as a single unit. The ability to manufacture a headliner assembly with attached sunvisor assemblies, instead of requiring the installation of the sunvisor assemblies in the vehicle subsequent to the installation of the headliner in the vehicle, provides greater flexibility in the manufacture and installation of headliner assemblies by automobile manufacturers and thereby creates the potential for improved cost efficiencies.

Another advantage is that the mounting assembly does not require tools or separate fasteners to attach the visor blade to either the headliner or the roof panel of the vehicle. Eliminating the need for fasteners and tools can be beneficial for a number of reasons, e.g., fasteners often diminish the aesthetics of the installed visor mounting assembly, fasteners are often relatively labor intensive, and thus expensive, to install, and the use of fasteners and tools is potentially damaging to the interior materials and finishes within the vehicle.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 2 is a top view of the assembly of FIG. 1 after insertion through an opening in a headliner.

FIG. 3 is a bottom view of the assembly of FIG. 1 after insertion through an opening in a headliner.

FIG. 4 is a top view of the assembly of FIG. 2 after being rotated relative to the headliner.

FIG. 5 is a bottom view of the assembly of FIG. 2 after being rotated relative to the headliner.

FIG. 6 is a partial sectional view of a mounting bracket assembly after insertion through an aperture in a sheet metal roof.

FIG. 7 is a partial sectional view of the mounting bracket assembly of FIG. 6 after camming the mounting bracket into engagement with the sheet metal roof.

FIG. 8 is a perspective view of a retainer clip.

FIG. 9 is a perspective view of an alternative retainer clip and a retaining plate.

FIG. 10 is a perspective view of a mounting bracket assembly having an unlock recess.

FIG. 11 is a sectional view of the unlock recess of the mounting bracket assembly of FIG. 10.

FIG. 12 is an exploded perspective view of an alternative embodiment of a mounting bracket assembly.

FIG. 13 is a perspective view of the mounting bracket assembly of FIG. 12 in an assembled condition.

FIG. 14 is a top view of the assembly of FIG. 12 being inserted through an opening in a headliner.

FIG. 15 is a top view of the assembly of FIG. 12 being rotated with respect to the headliner.

FIG. 16 is a partial perspective view of the assembly of FIG. 12 prior to engagement of the rotational stop and mounting bracket FIG. 17 is a partial perspective view of the assembly of FIG. 12 after engagement of the rotational stop and mounting bracket.

FIG. 18 is a perspective view of an alternative rotational stop.

FIG. 19 is a sectional view of the rotational stop of FIG. 18.

FIG. 20 is a partially sectional view of a mounting bracket assembly having an elbow which mounts within a recess of the mounting bracket FIG. 21 is a partially sectional view of a mounting bracket assembly having an elbow with a shroud.

FIG. 22 is a front view of a mounting bracket assembly having a stylized exterior.

FIG. 23 is an end view of the mounting bracket assembly of FIG. 22.

FIG. 24 is a bottom view of the mounting bracket assembly of FIG. 22.

FIG. 25 is a front view of an alternatively styled mounting bracket assembly.

FIG. 26 is an end view of the mounting bracket assembly of FIG. 25.

FIG. 27 is a bottom view of the mounting bracket assembly of FIG. 25.

FIG. 28 is a perspective view of an elbow for an additional embodiment of the invention.

FIG. 29 is a perspective view of an inner bracket member for use with the elbow of FIG. 28.

FIG. 30 is a top view of the inner bracket member of FIG. 29.

FIG. 31 is a side view of the inner bracket member of FIG. 29.

FIG. 32 is a perspective view of a locking disk for use with the elbow of FIG. 28.

FIG. 33 is a top view of the locking disk of FIG. 32.

FIG. 34 is a perspective view of a mounting bracket member for use with the elbow of FIG. 28.

FIG. 35 is a perspective view of a portion of the mounting bracket member of FIG. 34.

FIG. 36 is a cut-away perspective view of the components of FIGS. 28–35.

FIG. 37 is another embodiment of a mounting bracket member.

FIG. 38 is a perspective cutaway view of a portion of the bracket of FIG. 37.

FIG. 39 is a partial cutaway view of the bracket of FIG. 37 when assembled with a headliner and roof panel of an automobile.

Figure 1:
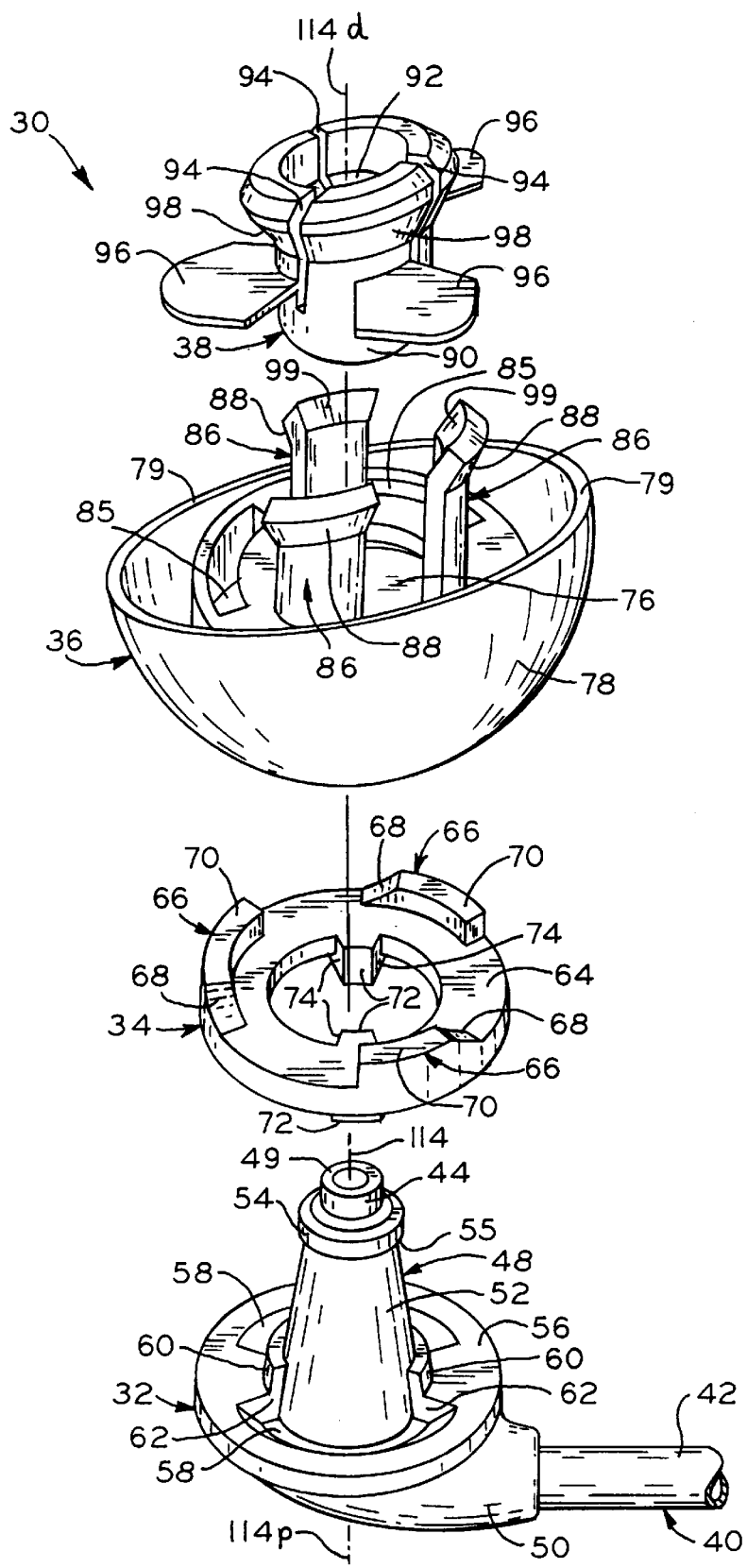
FIG. 1 is an exploded perspective view of a mounting assembly.

Corresponding reference characters indicate corresponding parts throughout the several views. Although the drawings represent embodiments of the present invention, the drawings are not necessarily to scale and certain features may be exaggerated The exemplification set out herein illustrates embodiments of the invention, in several forms. The embodiments disclosed below, however, are not intended to be exhaustive or limit the invention to the precise forms disclosed in the following detailed description and such exemplifications are not to be construed as limiting the scope of the invention.

Furthermore, although the terms upper, lower, vertical, horizontal and their functional equivalents are used in the description of the disclosed embodiments, these terms are not to be interpreted as limiting the orientation of the described components or the scope of the invention but are used instead to provide a more concise and readily understandable description of the disclosed embodiments.

DESCRIPTION OF THE PRESENT INVENTION

Referring now to the drawings and particularly to FIG. 1, there is shown an exploded view of a mounting bracket assembly 30. Mounting bracket assembly 30 includes an elbow 32, locking disk 34, outer mounting bracket 36 and inner bracket 38. Elbow 32 surrounds support rod 40. Support rod 40 forms an approximately 90° angle, or bend, near one end and includes an elongate cantilevered section 42 on which visor blade 46 is rotatably supported and a shorter section 44. Elbow 32 is disposed on support rod 40 near the bend and extends partially along both sections 42, 44 of support rod 40. The elbow includes a mounting section 48 which is inserted into mounting bracket 36 and an exterior section 50 which is visible after installation of mounting assembly 30. Mounting section 48 extends primarily along section 44 of support rod 40 while exterior section 50 extends primarily along elongate section 42 of support rod 40.

Mounting section 48 defines an axis 114 of assembly 30. After installation in a vehicle, elbow 32 is rotatable about axis 114 and thereby permits a sunvisor to be rotated from a forward position adjacent a windshield to a side position adjacent a side window. Axis end 114p has been defined as the proximal end of assembly 30 and axis end 114d has been defined as the distal end of assembly 30 merely to facilitate the discussion of axial movements and relative axial positions.

Support rod 40 is formed of a hollow metal tube which allows wiring to be routed from within the roof panel of the vehicle to visor blade 46. Elbow 32 is overmolded on support rod 40 and is formed of a glass-filled nylon material. Alternative materials, however, may also be used to form support rod 40 and elbow 32. For example, support rod 40 may comprise a solid metal or plastic rod and elbow 32 could be formed integrally with the support rod. Furthermore, although the bend in the elbows and support rods disclosed herein define an angle of approximately 90°, other angles may also be employed. The locking disk 34, mounting bracket 36 and inner bracket 38 are integrally molded from a resilient plastic such as Acetal.

As can be seen in FIGS. 1, 6 and 7, mounting section 48 of elbow 32 includes a generally frustoconical portion 52 and an annular flange 54. Surrounding the base of the frustoconical portion 52 is a disk engagement surface 56. Disk engagement surface 56 includes travel recesses 58 and rotation lugs 60. Rotation lugs 60 along with recesses 58 define engagement surfaces 62 which are rotationally engageable with locking disk 34.

Locking disk 34 includes a washer-shaped disk portion 64 and a plurality of camming elements 66 extending from disk portion 64. Camming elements 66 take the form of arcuate lifting ramps in mounting assembly 30. Camming elements 66 are located near an outer perimeter of disk portion 64 and include an inclined camming surface 68 and a distal surface 70.

Travel stops 72 also extend from disk portion 64 and are disposed on a radially inward perimeter of disk portion 64. Travel stops 72 extend both radially inward and proximally. Engagement surfaces 74 located on the lateral edges of travel stops 72 are adapted to engage engagement surfaces 62 located on travel recesses 58 and rotation lugs 60 when the frustoconical portion 52 of elbow 32 is inserted through the central opening of locking disk 34. When elbow 32 and locking disk 34 are assembled together, locking disk 34 is disposed adjacent disk engagement surface 56 and travel stops 72 are partially disposed within travel recesses 58. Because travel recesses 58 are larger than travel stops 72, elbow 32 and locking disk 34 may be relatively rotated through a predetermined arcuate path without engaging surfaces 62 and 74.

After placing locking disk 34 on elbow 32, mounting section 48 of elbow 32 is inserted through a central opening 76 in outer mounting bracket 36. Mounting bracket 36 includes a laterally extending portion or shroud 78 which, when assembly 30 is installed against a headliner, abuts the headliner and forms an aesthetically pleasing exterior surface. Located between shroud 78 and central opening 76 is a recess 80 adapted to receive locking disk 34. Recess 80 includes a sidewall 82 and a distal recess wall 84. Distal recess wall 84 includes a plurality of arcuate slots 85 which receive camming elements 66 when elbow 32 and locking disk 34 are assembled with outer mounting bracket 36. When assembled, locking disk 34 is disposed in recess 80 between, and engaging, the generally laterally extending proximal surface of distal recess wall 84 and the generally laterally extending disk engagement surface 56.

Frustoconical portion 52 extends distally through central opening 76 located in distal recess wall 84. Circumferentially disposed adjacent central opening 76 are a plurality of securement members 86. Securement members 86 are resilient finger-like projections which extend from the distal surface of wall 84 in a distal direction. The distal portions of securement members 86 include radially outwardly directed latching surfaces 88. Fingers 86 are disposed about central opening 76 in a spaced arrangement whereby a plurality of open ended slots are formed therebetween.

Inner bracket 38 has a generally tubular hollow portion 90. The interior surface of tubular portion 90 includes an annular projection 92 which projects radially inwardly and is adapted to engage annular flange 54 of elbow 32. Tubular portion 90 also includes a plurality of grooves 94 which extend from one end of inner bracket 38 through annular projection 92. Grooves 94 provide inner bracket 38 with increased flexibility and permit the radial outward biasing of annular projection 92 by annular flange 54 when inner bracket 38 is fitted over the terminal end 49 of elbow 32. After inner bracket 38 is inserted over the distal end of elbow 32 and annular projection passes annular flange 54, annular projection 92 snaps back radially inwardly and engages the generally laterally extending proximate annular surface 55 of annular flange 54 thereby securing inner bracket 38 to elbow 32.

Inner bracket 38 also includes radially outwardly extending projections or retaining members 96. Retaining members 96 are configured to extend through the open-ended slots formed between fingers 86 and are used to secure assembly 30 to a headliner and also prevent the retraction of elbow 32 from central opening 76. After engagement of inner bracket 38 with elbow 32, retaining members 96 are positioned in a plane which is axially spaced in a distal direction and generally parallel to edge 79.

Camming surfaces 98 are located on the radial exterior surface of tubular portion 90 near the upper end of inner bracket 38. Cammning surfaces 98 are used to bias securement members 86 radially outward to secure assembly 30 to an apertured vehicle roof panel as discussed in greater detail below.

After securing elbow 32, locking disk 34, outer mounting bracket 36 and inner bracket 38 together to form mounting assembly 30, mounting assembly 30 is secured to a headliner 100 to thereby attach to headliner 100 a visor blade assembly comprising support rod 40 and visor blade 46. An opening or aperture 102 is located in headliner 100 through which a distal portion of mounting assembly 30 is inserted as shown in FIGS. 2 and 3.

Insertion of a distal portion of mounting assembly 30 through opening 102 engages an edge 79 of shroud 78 with the front, or proximal, surface 106 of headliner 100. Retaining members 96 are included in the portion of assembly 30 which is inserted through opening 102. In the illustrated embodiment, opening 102 is generally triangular and retaining members 96 fit within and generally conform to the rounded corners of opening 102. The length of each side of opening 102 is approximately 1.712 inches in the illustrated embodiment.

Retaining members 96 are distally spaced from edge 79 by a distance which is approximately equivalent to the thickness of headliner 100. Retaining members 96 and edge 79 lie in approximately parallel planes which extend generally laterally (or radially outwardly), but not necessarily at a right angle, to axis 114. Retaining members 96 have an outer perimeter which is configured to permit retainer members 96 to be inserted through opening 102 if retaining members 96 are properly oriented. Shroud 78 has an edge 79 which defines a larger outer perimeter than that defined by retaining members 96. Edge 79 engages front surface 106 when retaining members 96 are inserted through opening 102. Thus, retainer members 96 and edge 79 lie on opposite sides of a generally planar space having a thickness approximately equivalent to the thickness of headliner 100 and with edge 79 disposed radially outwardly of the outer perimeter of retainer members 96 as can be seen in FIG. 7 which illustrates an installed assembly 30.

After insertion of assembly 30, mounting assembly 30 and attached visor blade 46 are rotated relative to headliner 100 from the positions shown in FIGS. 2 and 3 to the positions shown in FIGS. 4 and 5 as indicated by the arrow in FIG. 5. Rotation of assembly 30 repositions retaining members 96 which thereby extend beyond the perimeter of opening 102 and engage the rear, or distal, surface 104 of headliner 100 as shown in FIG. 4. Edge surface 79 of shroud 78 continues to engage the opposite front surface 106 during the rotation of assembly 30. Front surface 106 comprises the exposed surface of headliner 100 after headliner 100 has been installed in a vehicle. Thus, after rotation of assembly 30, retaining members 96 and shroud 78 engage opposite surfaces of headliner 100 and thereby secure assembly 30 to headliner 100.

When rotating visor assembly 30 after insertion through headliner opening 102, the entire visor assembly is rotated relative to headliner 100 without relative rotation between the various components comprising assembly 30. The relatively light resistance provided by headliner 100 should not cause relative rotation of the components of visor assembly 30. However, if the components of assembly 30 begin to rotate relative to each other, assembly 30 can be rotated by grasping both outer mounting bracket 36 and visor blade 46 and rotating these two components together to prevent relative rotation of the assembly components.

The free end of visor blade 46 is snapped into engagement with clip 108 to secure the visor assembly in place and prevent the inadvertent movement of the installed visor assembly. After both the driver side and passenger side visor assemblies are secured to headliner 100, the headliner assembly may be packaged and/or shipped to an automobile or truck assembly plant for installation in a vehicle.

Although a generally triangular opening 102 is illustrated, alternative non-circular openings may also be used with appropriately shaped retaining members to secure assembly 30 to a headliner 100 in the same manner as described above for retaining members 96. The use of a non-circular headliner opening permits retaining members 96 to be inserted through the headliner opening and subsequently engage the rear surface of the headliner upon relative rotation of the retaining members and the headliner. The headliner opening may also be shaped to allow the mounting assembly to be inserted in only one orientation, for example an aperture having the general shape of an isosceles triangle, and thereby prevent the mounting assembly from being installed in an incorrect position. It is also possible to use differently shaped apertures in the headliner for the driver side and passenger side to prevent the incorrect installation, for example, of a driver side assembly on the passenger side of the headliner.

Headliner 100 and attached mounting assemblies 30 are installed in a vehicle by attaching mounting assemblies 30 to apertures in a roof panel of the vehicle and securing the remainder of the headliner to the vehicle roof using conventional methods well known in the art. The attachment of a mounting assembly 30 to an apertured sheet metal panel forming the roof of a vehicle is illustrated in FIGS. 6 and 7. The securement of a portion of headliner 100 adjacent opening 102 between retaining arm 96 and shroud edge 79 is illustrated in FIG. 7 but is not shown in FIG. 6.

The distal end of mounting assembly 30, including securement members 86, is inserted through a round aperture 110 in roof panel 112 while camming elements 66 are disposed within arcuate slots 85. After insertion of securement members 86, elbow 32 is rotated relative to outer mounting bracket 36. Relative rotation of elbow 32 engages surfaces 62 and 74 and causes locking disk 34 to rotate with elbow 32. As locking disk 34 rotates with elbow 32, each of the inclined camming surfaces 68 of camming elements 66 engage an edge of the arcuate slot 85 in which the ramp 66 is located. Continued rotation of locking disk 34 and inclined camming surfaces 68 biases locking disk 34 against disk engagement surface 56 of elbow 32 and forces elbow 32 away from the distal recess wall 84 of outer mounting bracket 36 in a proximate direction. When camming elements 66 have been rotated entirely out of arcuate slots 85, distal surfaces 70 of camming elements 66 bear against distal recess wall 84 of outer mounting bracket 36 as shown in FIG. 7. The arc length of inclined camming surfaces 68 is 60° in the illustrated embodiment. Increasing the arc length of inclined camming surfaces 68 would decrease the maximum torque required to cammingly rotate locking disk 34. Increasing the arc length of inclined camming surfaces 68 beyond the arc length required to permit visor blade 46 to be rotated between a forward position adjacent the vehicle windshield and a side position adjacent the vehicle side window, however, could result in installation difficulties.

The camming action of inclined camming surfaces 68 not only biases disk engagement surface 56 of elbow 32 away from distal recess wall 84 but also thereby causes annular flange 54 of elbow 32 to bear against annular projection 92 biasing inner bracket 38 in a proximate axial direction. As inner bracket 38 is biased proximally relative to outer mounting bracket 36, camming surfaces 98 located on the radial exterior surface of inner bracket 38 engage a camming surface 99 on the radial inner surface of securement members 86 and bias the distal end of securement members 86 in a radially outward direction. As securement members are biased radially outward, latching surfaces 88 engage the interior perimeter of aperture 110 and thereby secure assembly 30 to roof panel 112.

Inner bracket 38 not only engages securement members 86 on its radially exterior surface but also engages frustoconical portion 52 of elbow 32 at the inner radial surface of annular projection 92 and along the proximal portion of inner bracket 38 as seen in FIG. 7. The engagement of inner bracket 38 and frustoconical portion 52 provides frictional resistance but does not prevent the rotation of elbow 32 within inner bracket 38 after installation of the mounting assembly in a vehicle.

Securement members 86 have an outer perimeter which define portions of a generally circular shape and are thereby adapted to be inserted in a round aperture 110 which in the illustrated embodiment has a diameter of approximately 1.0 inch. By appropriately altering the shape of securement members 86, securement members 86 can be used to attach mounting assembly 30 to alternatively shaped apertures in a vehicle roof panel.

Once installed in a vehicle, it is generally only necessary that elbow 32 rotate through a sufficiently large arc to permit visor blade 46 to be rotated between a forward position adjacent the vehicle windshield and a side position adjacent the vehicle side window. Camming elements 66 and arcuate slots 85 are configured so that rotation of the elbow from the front position to the side position, immediately after insertion of the securement members 86 into panel aperture 110, rotationally engages elbow 32 and locking disk 34 and secures assembly 30 to roof panel 112 during the rotation of visor blade 46 to the side position. After securing mounting assembly 30 to roof panel 112, travel recesses 58 permit the rotation of elbow 32 back to a forward position without rotationally engaging locking disk 34 and have a sufficiently large arc to permit the movement of visor blade 46 between a forward and side position without engaging surfaces 62 and 74. Thus, elbow 32 and locking disk 34 are not rotationally engaged and locking disk 34 is not rotated when visor blade 46 is rotated between a front position and a side position after the initial installation rotation of visor blade 46 from the front position to the side position.

Although visor blade 46 is typically not rotated beyond that necessary to move visor blade 46 between the front position and the side position, overrotation of the visor blade could cause camming elements 66 to align with arcuate slots 85 and allow securement members 86 to disengage from aperture 110 in roof panel 112. FIGS. 18 and 19 illustrate a mechanism to inhibit overrotation, and reverse rotation, of locking disk 34 and the potential inadvertent disengagement of securement members 86 associated therewith.

Recess 80, in the embodiment shown in FIG. 18, includes a travel stop 138 and a protuberance 140. Camming elements 66 include a cutout portion 142, shown in dashed lines in FIG. 18, which has a stop surface 144 for engaging travel stop 138. In FIG. 18, the upper portion of camming element 66 is shown but the base of camming element 66 and disk portion 64 of locking disk 34 is not illustrated. FIG. 18 illustrates the position of camming element 66 after camming surface 68 has engaged the edge of arcuate slot 85 to axially bias apart mounting bracket 36 and elbow 32 and distal surface 70 has engaged distal recess wall 84. As the rotation of camming element 66 is continued, camming element 66 will engage protuberance 140 and slightly bias side wall 82 outward to permit passage of camming element 66.

Travel stop 138 prevents camming element 66 from being overrotated and being received within the next arcuate slot 85 by engaging stop surface 144. Cutout 142 is used to provide a stop surface 144 which is oriented generally perpendicular to the direction of rotation of camming element 66. If a cutout were not used and camming surface 68 were to engage travel stop 138, it is possible that instead of preventing the further rotation of disk 34, travel stop 138 would merely axially bias elbow 32 and mounting bracket 36 further apart.

Protuberance 140 does not have a length sufficient to engage disk portion 64 when upper surface 70 is engaged with distal recess wall 84. When stop surface 144 engages travel stop 138, camming element 66 has rotated past protuberance 140 which then snaps back radially inward adjacent the rear surface 146 of camming element 66 as shown in FIG. 19. FIG. 19 is a crossectional view taken through travel stop 138 looking towards disk portion 64 after stop surface 144 has engaged travel stop 138 and thereby prevented the continued rotation of camming element 66. Protuberance 140, positioned adjacent the rear surface 146 of camming element 66, inhibits the reverse rotation of camming elements 66. Although protuberance 140 inhibits the reverse rotation of camming elements 66, protuberance 140 does not entirely prevent such rotation and the application of light or moderate force will bias protuberance 140 radially outward and permit camming elements 66 to be rotated in a reverse direction.

It can be advantageous to have the ability to remove mounting assembly 30 and the reverse rotation of locking disk 34 and camming elements 66 permits the removal of mounting assembly 30. For example, it may be desirable to remove assembly 30 to install a new visor assembly, to gain access to the vehicle panel to which assembly 30 is attached, or for other reasons. FIGS. 10 and 11 illustrate how mounting assembly 30 can be removed. An access slot 148 is located in elbow 32. Locking disk 34 also includes an access slot 150 near the outer perimeter of disk portion 64 and which is alignable with access slot 148. (Access slots 148, 150 are only shown in FIGS. 10 and 11.)

To remove mounting assembly 30 from roof panel 112, inner bracket 38 must be moved axially in a distal direction to thereby permit securement members 86 to move radially inward and disengage from aperture 110 in roof panel 112. This is accomplished by, first, aligning access slots 148, 150 and inserting a screwdriver 152 or other appropriate tool through slots 148 and 150 to thereby permit the rotation of screwdriver 152, elbow 32 and locking disk 34 as a single unit. Second, the screwdriver 152, elbow 32 and locking disk 34 are rotated together in the direction opposite to the rotational direction used to bias elbow 32 and mounting bracket 36 axially apart during the installation of mounting assembly 30. During this reverse rotation of locking disk 34, reverse rotation of camming elements 66 will be inhibited by protuberances 140, however, when light to moderate force is applied, protuberances 140 will be biased radially outward and camming elements 66 can be rotated in the reverse direction (relative to the direction of installation). Screwdriver 152, elbow 32 and locking disk 34 are rotated in the reverse direction until canning elements 66 are received in arcuate slots 85 and elbow 32 can be moved axially towards mounting bracket 36 thereby permitting the distal axial movement of inner bracket 38 and the disengagement of securement members 86. Once securement members 86 have been disengaged, mounting assembly 30 can be removed from aperture 110 in roof panel 112.

As discussed above, elbow 32 is used to rotate locking disk 34 and thereby bias elbow 32 axially away from mounting bracket 36 during the installation of mounting assembly 30. By configuring access slots 148 and 150 to align at the point where elbow 32 is rotationally engaged with locking disk 34 and has just reached the point where travel stop 138 prevents further rotation of locking disk 34 and elbow 32, (for example, when visor blade 46 is in a side position) this facilitates the reverse rotation of the screwdriver 152, elbow 32 and locking disk 34 by enabling the necessary reverse rotation to occur through the same swing path used during the installation of mounting assembly 30 to panel 112, (for example, from the side position to the front position) and without having visor blade 46 encounter obstacles.

Clip 108 is illustrated in FIG. 8 and an alternative clip 108a is shown in FIG. 9. Both clips 108, 108a include a receptacle 116 for a support pin located on the free end of visor blade 46 and may be molded using a resilient plastic such as Acetal. Clip 108 includes flexible flaps 118 which flex to permit their insertion through openings in a headliner. The openings and flaps 118 are sized so that after insertion through the headliner openings, flaps 118 return to their original positions shown in FIG. 8 and prevent retraction of flaps 118 through the headliner openings. Clip 108 is attached to the headliner prior to installation of the headliner in the vehicle. Clip 108 may thereby be used to secure the free end of visor blade 46 after attaching mounting assembly 30 to the headliner as illustrated in FIG. 5.

When headliner 100, together with attached mounting assembly 30 and clip 108, is installed in a vehicle, clip 108 is attached to a vehicle roof panel and thereby helps secure headliner 100 to the panel. To secure clip 108 to a vehicle roof panel, latch members 120 are inserted through an opening in the panel together with flexible flaps 118 extending therefrom. Latch members 120 are biased inwards during insertion and after returning to their original positions shown in FIG. 8, projections 122 on latch members 120 prevent retraction of latch members 120 through the panel opening. Stop members 121 can be inserted through apertures in the headliner to engage the proximal surface of either the vehicle roof panel or retaining plate 136 and maintain an adequate space between clips 108, 108a and the vehicle roof panel and retaining plate for headliner 100.

Curved members 124 are also used to fasten clip 108 to the panel. Curved members 124 define two relatively large generally circular portions 126, 128. Located below circular portions 126, 128 are smaller curved surfaces 130, 132. An elongate member 180 can be inserted into channel 182 shown in outline in FIG. 8. Member 180 includes two push pin portions 184, 186 configured to engage smaller curved surfaces 130, 132 and thereby bias curved members 124 outward. By biasing curved members 124 outward the vehicle roof panel can be engaged by notches 134 disposed on the exterior of curved members 124 and thereby secure clip 108 to the panel. After inserting member 180 through channel 182 and outwardly biasing curved members 124, member 180 can be further inserted to place push pin portions 184, 186 within circular portions 126, 128 and thereby allow curved members 124 to be disengaged from the vehicle roof panel.

Clip 108a is similar to clip 108 but does not include flexible flaps 118. Clip 108a is secured to the headliner prior to installation of the headliner in a vehicle by placing a retaining plate 136 adjacent the rear surface of the headliner and attaching clip 108a to retaining plate 136 to thereby secure clip 108a to the headliner. Clip 108a is attached to retaining plate 136 in the same manner clip 108 is attached to the vehicle panel. Clip 108a is then attached to the vehicle panel, as described above with reference to clip 108, with both retaining plate 136 and headliner 100 disposed between the vehicle panel and clip 108a.

The use of a retaining plate will permit many conventional clips, typically mounted through a headliner directly to a vehicle roof panel during installation of the headliner in the vehicle, to be mounted to a headliner prior to installation of the headliner in a vehicle. Additionally, a wide variety of clips having flexible flaps similar to those found on clip 108 or other engagement means for retaining the clip directly to the headliner may be used to engage the clip to the headliner without a retaining plate.

An alternative mounting bracket assembly 30a is illustrated in FIGS. 12–17. Mounting bracket assembly 30a includes features which generally flnction in a manner similar to the features found in mounting bracket assembly 30. Accordingly, references numbers with the suffix "a" are used with the features of mounting assembly 30a shown in FIGS. 12–17 which function in a manner similar to features found in mounting assembly 30 having the same reference numeral. Because a discussion of each of these features would be unnecessarily duplicative of the discussion of mounting assembly 30 set forth above, the discussion of mounting assembly 30a set forth below focuses upon those features which most differentiate mounting assemblies 30 and 30a.

FIG. 12 shows mounting assembly 30a in an exploded view. When elbow 32a and locking disk 34a are assembled together, rotational lug 154 is disposed within travel groove 156. Groove 156 has a length which is sufficient to permit the rotation of elbow 32a between a forward position and a side position without rotationally engaging disk 34a. Stop surfaces 158 at the ends of travel groove 156 limit the extent of relative rotation between elbow 32a and locking disk 34a Engagement of rotational lug 154 with a stop surface 158 will rotationally engage locking disk 34a and elbow 32a and thereby allow rotation of elbow 32a to cause the camming apart of elbow 32a and mounting bracket 36a during installation of mounting assembly 30a.

Locking disk 34a also includes a travel stop 160 which extends from the outer edge of disk portion 64a. As can be seen in FIGS. 16 and 17, a cut-out in sidewall 82a and distal recess wall 84a allows travel stop 160 to extend therethrough FIG. 16 illustrates mounting assembly 30a when camming elements 66a are disposed within arcuate slots 85a prior to the axial biasing apart of elbow 32a and mounting bracket 36a. As elbow 32a and locking disk 34a are rotated from the position shown in FIG. 16 to the position shown in FIG. 17, travel stop 160 is rotated clockwise and simultaneously moves axially in a proximal direction relative to mounting bracket 36a Stop surface 162 prevents the over-rotation of locking disk 34a. Stop member 164 inhibits the reverse rotation of locking disk 34a after travel stop 160 has abutted stop surface 162. When light to moderate force is applied, however, stop member 164 will not prevent the reverse rotation of locking disk 34a thereby allowing mounting assembly 30a to be removed from a vehicle panel after the initial installation of assembly 30a.

As best seen in FIGS. 12 and 13, securement members 86a have engagement surfaces which are disposed to secure mounting assembly 30a to the vehicle panel at a round aperture in a generally perpendicular orientation to axis 114a of mounting assembly 30a. Axis 114a is also perpendicular to the plane which contains shroud edge 79a. Axis 114 of mounting assembly 30, on the other hand, is not perpendicular to the plane which contains shroud edge 79 or to roof panel 112 adjacent aperture 110 when secured to assembly 30 (which is generally parallel to the plane containing shroud edge 79).

The attachment of mounting assembly 30a to headliner 100 at a generally triangular aperture 102a is illustrated in FIGS. 14 and 15. First, retaining members 96a are inserted through aperture 102a as shown in FIG. 14. Retaining members 96a have a leading edge 166 which is slightly upturned. Mounting assembly 30a is then rotated relative to headliner 100 to secure mounting assembly 30a to the headliner as shown in FIG. 15. As mounting assembly 30a is rotated to the position shown in FIG. 15, upturned leading edges 166 of retaining members 96a facilitate the engagement of retaining members 96a with rear surface 104 of headliner 100 by reducing the possibility of retaining members 96a engaging headliner edges 168 defining aperture 102a and thereby preventing the rotation of assembly 30a.

Mounting assembly 30a is attached to a vehicle roof panel 112 together with headliner 100 subsequent to the attachment of assembly 30a to headliner 100. Inner bracket 38a includes a camming surface 98a which engages the radially inward surface of securement members 86a. A projection 170 and connecting surface 172 form a camming surface on the radially inner portion of securement members 86a. Camming surface 98a engages connecting surface 172 and, as rotation of locking disk 34a biases elbow 32a and inner bracket 38a in an axially proximate direction relative to mounting bracket 36a, upper collar portion 174 is placed into engagement with projection 170 thereby biasing securement members 86a radially outwardly to secure assembly 30a to a vehicle panel. Although sloped camming surface 98a is located on inner bracket 38a and generally perpendicular (to axis 114a) surface 172 is on securement members 86a in the illustrated embodiment, in alternative embodiments surface 172 could be sloped to facilitate the camming action between inner bracket 38a and securement members 86a.

The present invention can be used with mounting assemblies having a wide variety of different stylistic features. Two major stylistic categories of mounting assemblies with which the present invention can be utilized are illustrated in FIGS. 20 and 21. FIG. 20 illustrates a recessed elbow 32b which fits within recess 80 in mounting bracket 36b and does not extend radially outwardly beyond the outer perimeter of recess 80. Elbow 32, illustrated in FIG. 1, is a recessed elbow.

Overlaying elbow 32c, on the other hand, has a covering member 176 which extends radially outward beyond the perimeter of recess 80 and covers a portion of mounting bracket 36c. Covering member 176 serves an aesthetic purpose and is not required for the functionality of the mounting assembly. FIGS. 20 and 21 merely illustrate different aesthetic styles which may be used with the present invention and are not intended to illustrate the functional structure of the mounting assemblies and, accordingly, several aspects of the mounting assembly structure have been simplified or omitted in FIGS. 20 and 21.

FIGS. 22–24 illustrate different views of one embodiment of a mounting assembly having an overlaying elbow 32c. FIGS. 25–27 illustrate different views of one embodiment of a mounting assembly having a recessed elbow 32b.

FIGS. 28–36 illustrate an additional embodiment of the invention, i.e., mounting bracket assembly 30b. Mounting bracket assembly 30b includes features which generally function in a manner similar to the features found in mounting bracket assembly 30 and 30a. Accordingly, references numbers with the suffix "b" are used with the features of mounting assembly 30b shown in FIGS. 28–36 which function in a manner similar to features found in mounting assembly 30 or 30a having the same reference numeral. Because a discussion of each of these features would be unnecessarily duplicative of the discussion of mounting assembly 30 set forth above, the discussion of mounting assembly 30b set forth below focuses upon those features which differentiate mounting assemblies 30, 30a and 30b.

As can be seen in FIGS. 29–31 and 36, inner bracket 38b includes ribs 178. In the illustrated embodiment, two ribs 178 strengthen each retaining arm 96b. For one retaining arm 96b, a wire opening 180 is placed between ribs 178. Wires running through a hollow support rod to the visor blade from the vehicle roof, such as those used to illuminate a vanity mirror, may be routed through opening 180.

Locking disk 34b includes a washer shaped disk portion 64b which is relatively thin and stepped. Locking disk 34b also has arcuate ramps 66b which have an inwardly extending extension 182. Located below extensions 182 and radially inwardly of ramps 66b are openings 183.

Extensions 182 cooperate with supports 184 located within arcuate slots 85b in outer mounting bracket 36b. Each support 184 has a catch 186 which extends upwardly near its forward end and an inclined camming surface 188 defining its forward end. As described above, after assembling together an elbow, locking disk, inner bracket member and outer mounting bracket, the biasing of the elbow in a proximal direction causes the outward biasing of the outer mounting bracket fingers 86b. Prior to insertion into the vehicle roof structure, however, the outward biasing of the outer mounting bracket fingers could inhibit the insertion of the bracket into the roof structure and is undesirable. Preventing the unintentional outward biasing of fingers 86b is also desirable when removing a previously installed assembly 30b.

Extensions 182 inhibit the unwanted outward biasing of fingers 86b by providing a means for inhibiting the unintentional proximal biasing of inner bracket member 38b and elbow 32b. After assembly of elbow 32b, locking disk 34b, inner bracket member 38b and outer bracket member 36b, extension 182 is disposed in opening 85b forwardly of camming surface 188 (i.e., to the right of camming surface 188 in FIG. 35). Rotation of elbow 32b causes rotation lug 60b to engage travel stop 72b and rotate locking disk 34b. In the embodiment illustrated in FIGS. 35 and 36, counterclockwise rotation of elbow 32b and locking disk 34b causes extension 182 to ride up and over camming surface 188 and catch 186 thereby seating extension 182 above support 184 behind catch 186. Extension 182 may include an inclined surface (which matches the angle of camming surface 188) at its lower edge which engages camming surface 188 to facilitate the seating of extension 182.

Seating extension 182 above support 184 and behind catch 186 biases inner bracket member 38b in a distal direction as can be seen in FIG. 36 which in turn distally biases elbow 32b and thereby prevents the unintentional outward biasing of fingers 86b. After fingers 86b have been inserted through a roof panel aperture, fingers 86b are outwardly biased to secure assembly 30b to the roof panel. To outwardly bias fingers 86b, the illustrated locking disk 34b must be rotated counterclockwise. A light to moderate rotational force applied to elbow 32b will cause extension 182 to ride up and over catch 186 in the counterclockwise direction to unseat extension 182. Continued counterclockwise rotation of elbow 32b and locking disk 34b will bias elbow 32b and inner bracket member 38b in a proximal direction to outwardly bias fingers 86b in a manner similar to assemblies 30 and 30a.

FIGS. 37–39 illustrate an additional embodiment of the mounting bracket including a shroud 78c having three flexible fingers 86c, which each include two catch arms 190 which are separated by a slot 192. Furthermore, surrounding flexible fingers 86c are three locking ribs 194. As best seen in FIG. 39, in the assembled position, locking ribs 194 trap the sheet metal of the roof panel 112 against latching surfaces 88c. Headliner 100 is trapped against roof panel 112 by shroud 78c. The use of small catch arms 190 simplifies the insertion of the mounting bracket into the roof panel and the removal of the mounting bracket from the sheet metal. Furthermore, locking ribs 194 prevent the vertical movement of bracket 78c.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertain.

What is claimed is:

1. A mounting assembly for a vehicle visor blade assembly, said mounting assembly adapted for attachment to a headliner having a headliner aperture, a proximal surface, and a distal surface, said mounting assembly also adapted for attachment to a vehicle panel having a panel aperture, said mounting assembly comprising:

an elbow attachable to the said visor blade assembly;

a mounting bracket having an opening for rotatably receiving said elbow whereby rotation of said elbow defines an axis of said mounting assembly, said mounting bracket having a portion extending laterally relative to said axis, said laterally extending portion engageable with the said proximal surface of the said headliner;

at least one retaining member, said at least one retaining member axially spaced from said laterally extending portion in a distal direction and extending laterally relative to said axis, whereby a portion of the said headliner adjacent the said headliner aperture is attachably secured between said laterally extending portion and said at least one retaining member by engagement of the said proximal surface with said laterally extending portion and engagement of the said distal surface with said at least one retaining member; and at least one securement member insertable through the said panel aperture after attachment of said mounting assembly to the said headliner, said at least one securement member extending generally axially and in a distal direction whereby insertion of said securement member in the said panel aperture positions the said distal surface of the said headliner near the said vehicle panel, said at least one securement member having a latching surface for engaging the said panel adjacent the said panel aperture whereby said mounting assembly may be attached to the said panel.

2. The mounting assembly of claim 1 wherein said at least one retaining member is adapted for insertion through the said headliner aperture, said at least one retaining member defining a non-circular shape whereby, after insertion of said at least one retaining member through the said headliner aperture, rotation of said at least one retaining member relative to the said headliner aperture engages said at least one retaining member with the said distal surface of the said headliner.

3. The mounting assembly of claim 1 further comprising an inner bracket member axially engaged with said elbow and disposed radially inwardly of said at least one securement member and wherein said at least one retaining member is disposed on said inner bracket member and extends radially outwardly of said at least one securement member.

4. The mounting assembly of claim 3 further comprising a camming element operatively disposed between said elbow and said mounting bracket and adapted to bias said elbow axially apart from said mounting bracket in a proximal direction upon relative rotation of said elbow and said mounting bracket; said inner bracket further comprising a first camming surface engageable with a second camming surface disposed on a radially inward portion of said at least one securement member, proximal axial biasing of said elbow biasing said inner bracket in an axially proximal direction relative to said mounting bracket whereby said first and second camming surfaces bias said securement member radially outward.

5. The mounting assembly of claim 1 wherein said at least one securement member comprises a plurality of spaced securement members circumferentially disposed near said opening in said mounting bracket and wherein said mounting assembly further comprises an inner bracket member axially engaged with said elbow and disposed radially inwardly of said plurality of securement members and wherein said at least one retaining member comprises a plurality of generally laterally extending projections disposed on said inner bracket member and extending between and radially outwardly of said plurality of securement members.

6. The mounting assembly of claim 5 further comprising a camming element operatively disposed between said elbow and said mounting bracket and adapted to bias said elbow axially apart from said mounting bracket in a proximal direction upon relative rotation of said elbow and said mounting bracket; said inner bracket further comprising at least one first camming surface engageable with a second camming surface disposed on a radially inward portion on each of said plurality of securement members, proximal axial biasing of said elbow biasing said inner bracket in an axially proximal direction relative to said mounting bracket whereby said first and second camming surfaces bias said plurality of securement members radially outward.

7. The mounting assembly of claim 6 further comprising means for inhibiting the proximal biasing of said inner bracket.

8. The mounting assembly of claim 1 wherein said at least one retaining member is axially spaced from said laterally extending portion by a distance which is approximately equivalent to a thickness of the said headliner.

9. A mounting assembly for a vehicle visor blade assembly, said mounting assembly adapted for attachment to a headliner having a headliner aperture, a proximal surface, and a distal surface, said mounting assembly also adapted to secure the sunvisor to a vehicle panel having a panel aperture, said mounting assembly comprising:

an elbow attachable to the said visor blade assembly;

a mounting bracket having an opening and a shroud, said shroud disposed radially outwardly of said opening and engageable with the said proximal surface of the said headliner, said elbow rotatably receivable in said opening whereby rotation of said elbow defines an axis of said mounting assembly;

an inner mounting bracket engageable with said elbow and having a plurality of retaining members extending laterally relative to said axis, said retaining members axially spaced from said shroud in a distal direction, said retaining members adapted for insertion through the said headliner aperture whereby said shroud is engaged with the said proximal surface of the said headliner adjacent the said headliner aperture, said retaining members defining a non-circular shape whereby, after insertion through the said headliner aperture, rotation of said retaining members relative to the said headliner aperture attachably engages said retaining members with the said distal surface of the said headliner; and a plurality of spaced securement members circumferentially disposed on said mounting bracket near said opening, said securement members extending generally axially in a distal direction, said securement members insertable through the said headliner aperture and insertable through the said panel aperture after attachment of said mounting assembly to the said headliner, said securement members each having a latching surface for engaging the said panel adjacent the said panel aperture whereby said mounting assembly may be attached to the said panel.

10. The mounting assembly of claim 9 further comprising a camming element operatively disposed between said elbow and said mounting bracket and adapted to bias said elbow axially apart from said mounting bracket in a proximal direction upon relative rotation of said elbow and said mounting bracket; said inner bracket further comprising at least one first camming surface engageable with a second camming surface disposed on a radially inward portion on each of said plurality of securement members, proximal axial biasing of said elbow biasing said inner bracket axially proximal relative to said mounting bracket whereby said first and second camming surfaces bias said plurality of securement members radially outward.

11. The mounting assembly of claim 10 further comprising means for inhibiting the proximal biasing of said inner bracket.

12. The mounting assembly of claim 10 further comprising a camming member rotationally engageable with said elbow and axially disposed between a first generally laterally extending surface located on said elbow and a second generally laterally extending surface located on said mounting bracket, said camming member having a camming element adapted for biasing said first and second surfaces axially apart upon relative rotation of said camming element and said second surface;

each of said plurality of securement members having a second camming surface disposed on a radially inward portion of each of said plurality of securement members, said inner bracket further comprising at least one first camming surface engageable with said second camming surfaces, proximal axial biasing of said elbow biasing said inner bracket in an axially proximal direction relative to said mounting bracket whereby engaged relative movement of said first and second camming surfaces biases said plurality of securement members radially outward.

13. The mounting assembly of claim 12 wherein said elbow further comprises an annular flange having a generally laterally extending proximal flange surface engageable with said inner bracket member.

14. The mounting assembly of claim 12 wherein said camming member comprises a disk portion having a central hole, said elbow having a distal section insertable through said hole, said camming member including a plurality of arcuate camming elements disposed on said disk portion, said arcuate camming elements positionable in a plurality of slots in said second generally laterally extending surface, rotation of said arcuate camming elements relative to said slots engaging said camming elements with said second surface and biasing said first and second surfaces axially apart.

15. The mounting bracket of claim 12 wherein said inner bracket member includes a generally tubular portion disposed radially inwardly of said securement members and said retaining members extend from said generally tubular portion radially outwardly between said securement members whereby rotation of said inner bracket is inhibited, and said elbow comprises a frustoconical portion disposed within and frictionally engaged by said generally tubular portion.

16. The mounting assembly of claim 15 wherein said camming member comprises a disk portion having a central hole, said elbow having a distal section insertable through said hole, said camming member including a plurality of arcuate camming elements disposed on said disk portion, said arcuate camming elements positionable in a plurality of slots in said second generally laterally extending surface, rotation of said arcuate camming elements relative to said slots engaging said camming elements with said second surface and biasing said first and second surfaces axially apart.

17. A mounting assembly for a vehicle visor blade assembly, said mounting assembly adapted for attachment to a vehicle panel having a panel aperture, said mounting assembly comprising:

an elbow attachable to the said visor blade assembly;

a mounting bracket having an opening for rotatably receiving a distal section of said elbow whereby rotation of said elbow defines an axis of said mounting assembly, said mounting bracket having at least one securement member extending generally axially in a distal direction and insertable in the said panel aperture, said at least one securement member having a radially outwardly located latching surface for engaging the said panel adjacent the said panel aperture, said mounting bracket having a portion extending laterally relative to said axis whereby the mounting bracket limits the insertion of said securement member in the said panel aperture;

a camming element operatively disposed between said elbow and said mounting bracket and adapted to bias said elbow axially apart from said mounting bracket in a proximal direction upon relative rotation of said elbow and said mounting bracket; and an inner bracket member attachable to said distal section of said elbow, said inner bracket member having a first camming surface engageable with a second camming surface disposed on a radially inward portion of said at least one securement member, proximal axial biasing of said elbow biasing said inner bracket member in an axially proximal direction relative to said mounting bracket whereby said first and second camming surfaces bias said at least one securement member radially outward.

18. The mounting assembly of claim 17 wherein said camming element is disposed on a camming member rotationally engageable with said elbow and axially disposed between a first generally laterally extending surface located on said elbow and a second generally laterally extending surface located on said mounting bracket, said camming element adapted for biasing said first and second surfaces axially apart upon relative rotation of said camming element and said second surface.

19. The mounting assembly of claim 18 wherein said camming member comprises a disk portion having a central hole, said distal section of said elbow insertable through said hole, said camming element comprising a plurality of arcuate camming ramps disposed on said disk portion, said arcuate camming ramps positionable in a plurality of slots in said second generally laterally extending surface, rotation of said arcuate camming ramps relative to said slots engaging said camming ramps with said second surface and biasing said first and second surfaces axially apart.

20. The mounting assembly of claim 17 wherein said distal section of said elbow further comprises an annular flange having a generally laterally extending proximal flange surface engageable with said inner bracket member.

21. The mounting bracket of claim 17 wherein said inner bracket member includes a generally tubular portion disposed radially inwardly of said at least one securement member, said distal section of said elbow comprising a frustoconical portion disposed within and frictionally engaged by said generally tubular portion.

22. The mounting assembly of claim 17 wherein said at least one securement member comprises a plurality of securement members circumferentially disposed near said opening in said mounting bracket and wherein said inner bracket member is disposed radially inwardly of said plurality of securement members and has a plurality of generally lateral projections extending between and radially outwardly of said plurality of securement members.

23. The mounting assembly of claim 17 further comprising means for inhibiting the proximal biasing of said inner bracket.

24. The mounting assembly of claim 17 further including a locking rib for contacting the vehicle panel and for preventing movement of said mounting bracket in a direction transverse to the plane of said vehicle panel.

25. The mounting assembly of claim 17 wherein said at least one securement member comprises two flexible arms.

26. A method of installing a sunvisor assembly in a vehicle, said sunvisor assembly comprising a support rod having a visor blade pivotally mounted thereon and a mounting assembly attached to the support rod, relative rotation of the support rod and mounting assembly defining an axis of the mounting assembly, said method comprising:

inserting a distal portion of the mounting assembly through a headliner aperture in a headliner having a proximal surface and a distal surface, said insertion of the distal portion of the mounting assembly engaging a laterally extending portion of the mounting assembly with the proximal surface of the headliner;

rotating the mounting assembly relative to the headliner to engage at least one laterally extending retaining member disposed on the distal portion of the mounting assembly with the distal surface of the headliner to thereby attach the sunvisor assembly to the headliner;

installing the headliner and attached sunvisor assembly in the vehicle subsequent to the step of securing the mounting assembly to the headliner.

27. The method of claim 26 wherein said step of installing the headliner and attached sunvisor assembly in the vehicle comprises inserting a plurality of resilient securement members disposed on the distal portion of the mounting assembly through a panel aperture in a vehicle roof panel and engaging the securement members with the panel.

28. The method of claim 26 wherein said step of installing the headliner and attached sunvisor assembly in the vehicle comprises:

inserting a plurality of securement members disposed on the distal portion of the mounting assembly through a panel aperture in a vehicle roof panel; and biasing the securement members radially outward to thereby engage the securement members with the panel.

29. The method of claim 28 wherein said step of biasing the securement members radially outward comprises:

rotating an elbow of the mounting assembly about the axis to cammingly bias the elbow in a proximal axial direction away from a mounting bracket of the mounting assembly, the mounting bracket engaging the proximal surface of the headliner, the biasing movement of the elbow displacing an inner bracket member attached to the elbow and disposed radially inwardly of the securement members in a proximal axial direction whereby the proximal axial displacement of the inner bracket member biases the securement members radially outwardly.

30. The method of claim 26 further comprising the step of:

forming a non-circular opening in the headliner to form the headliner aperture; and wherein said step of inserting a distal portion of the mounting assembly through the headliner aperture includes inserting a plurality of retaining members through the non-circular opening.

31. The method of claim 26 further comprising the step of assembling the mounting assembly prior to the step of inserting a distal portion of the mounting bracket assembly through the headliner aperture; said step of assembling the mounting assembly comprising inserting a distal section of an elbow through an opening in a mounting bracket, the mounting bracket having a shroud disposed radially outwardly of the opening and forming the laterally extending portion of the mounting assembly, and attaching an inner bracket member having the at least one laterally extending retaining member disposed thereon to the distal section of the elbow to thereby prevent retraction of the elbow from the opening in the mounting bracket.

32. The method of claim 31 wherein said step of installing the headliner and attached sunvisor assembly in a vehicle comprises:

inserting a plurality of securement members disposed on the distal portion of the mounting assembly through a panel aperture in a vehicle roof panel; and biasing the securement members radially outward to thereby engage the securement members with the panel.

33. The method of claim 32 wherein said step of assembling the mounting assembly further comprises operatively disposing a camming element between the elbow and mounting bracket; and said step of biasing the securement members radially outward comprises:

rotating the elbow of the mounting assembly about the axis to cammingly bias the elbow in a proximal axial direction away from the mounting bracket, the biasing movement of the elbow displacing the inner bracket member disposed radially inwardly of the securement members in a proximal axial direction whereby the proximal axial displacement of the inner bracket member biases the securement members radially outwardly.

* * * * *